United States Patent
He et al.

(10) Patent No.: US 12,317,330 B2
(45) Date of Patent: May 27, 2025

(54) RANDOM ACCESS CHANNEL PROCEDURE TYPE SELECTION

(71) Applicant: QUALCOMM Incorporated, San Diego, CA (US)

(72) Inventors: Linhai He, San Diego, CA (US); Hung Dinh Ly, San Diego, CA (US); Mahmoud Taherzadeh Boroujeni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 428 days.

(21) Appl. No.: 17/808,349

(22) Filed: Jun. 23, 2022

(65) Prior Publication Data

US 2023/0065929 A1    Mar. 2, 2023

Related U.S. Application Data

(60) Provisional application No. 63/260,671, filed on Aug. 27, 2021.

(51) Int. Cl.
*H04W 24/08* (2009.01)
*H04W 74/00* (2009.01)
*H04W 74/0833* (2024.01)

(52) U.S. Cl.
CPC ....... *H04W 74/0833* (2013.01); *H04W 24/08* (2013.01); *H04W 74/004* (2013.01)

(58) Field of Classification Search
CPC .......................... H04W 24/08; H04W 74/0004
USPC ......................................... 370/329, 401, 405
See application file for complete search history.

(56) References Cited

U.S. PATENT DOCUMENTS

| 11,683,840 B2 * | 6/2023 | Lei .................... H04W 74/0891 370/330 |
| 2021/0051707 A1 | 2/2021 | Rastegardoost et al. |

OTHER PUBLICATIONS

International Search Report and Written Opinion—PCT/US2022/074342—ISA/EPO—Oct. 26, 2022.
Samsung: "MAC Aspects of UL Coverage Enhancements", 3GPP TSG-RAN2 Meeting #115 Electronic, R2-2107008, 3rd Generation Partnership Project (3GPP), Mobile Competence Centre, 650, Route Des Lucioles, F-06921 Sophia-Antipolis Cedex, France, vol. RAN WG2, No. Electronic, Aug. 9, 2021-Aug. 27, 2021, Aug. 5, 2021, 4 Pages, XP052032213, Abstract, Paragraph [02.1], paragraph [02.2].

* cited by examiner

*Primary Examiner* — Dang T Ton
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, one or more downlink reference signals. The UE may transmit, to the base station, a random access channel (RACH) message associated with a RACH procedure using a first RACH configuration that is associated with repetitions or a second RACH configuration that is not associated with repetitions based at least in part on whether a measurement of the one or more downlink reference signals satisfies a measurement threshold, wherein a selection of a RACH configuration is evaluated by the UE prior to a transmission of an initial message associated with the RACH procedure. Numerous other aspects are described.

30 Claims, 10 Drawing Sheets

RANDOM ACCESS CHANNEL PROCEDURE TYPE SELECTION

CROSS-REFERENCE TO RELATED APPLICATION

This Patent application claims priority to U.S. Provisional Patent Application No. 63/260,671, filed on Aug. 27, 2021, entitled "RANDOM ACCESS CHANNEL PROCEDURE TYPE SELECTION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for random access channel (RACH) procedure type selection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving one or more downlink reference signals. The method may include transmitting a random access channel (RACH) message associated with a RACH procedure using a first RACH configuration or a second RACH configuration based at least in part on whether a measurement of the one or more downlink reference signals satisfies a measurement threshold, wherein the first RACH configuration is associated with repetitions during the RACH procedure and the second RACH configuration is not associated with repetitions during the RACH procedure, and wherein a selection of a RACH configuration, of the first RACH configuration or the second RACH configuration, is evaluated by the UE prior to a transmission of an initial message associated with the RACH procedure.

Some aspects described herein relate to a method of wireless communication performed by a base station. The method may include transmitting one or more downlink reference signals intended for a UE. The method may include receiving a RACH message associated with a RACH procedure and the UE using a first RACH configuration or a second RACH configuration based at least in part on a measurement threshold, wherein the first RACH configuration is associated with repetitions during the RACH procedure and the second RACH configuration is not associated with repetitions during the RACH procedure.

Some aspects described herein relate to a UE for wireless communication. The UE may include a memory and one or more processors coupled to the memory. The one or more processors may be configured to receive one or more downlink reference signals. The one or more processors may be configured to transmit a RACH message associated with a RACH procedure using a first RACH configuration or a second RACH configuration based at least in part on whether a measurement of the one or more downlink reference signals satisfies a measurement threshold, wherein the first RACH configuration is associated with repetitions during the RACH procedure and the second RACH configuration is not associated with repetitions during the RACH procedure, and wherein a selection of a RACH configuration, of the first RACH configuration or the second RACH configuration, is evaluated by the UE prior to a transmission of an initial message associated with the RACH procedure.

Some aspects described herein relate to a base station for wireless communication. The base station may include a memory and one or more processors coupled to the memory. The one or more processors may be configured to transmit one or more downlink reference signals intended for a UE. The one or more processors may be configured to receive a RACH message associated with a RACH procedure and the UE using a first RACH configuration or a second RACH configuration based at least in part on a measurement threshold, wherein the first RACH configuration is associated with repetitions during the RACH procedure and the second RACH configuration is not associated with repetitions during the RACH procedure.

Some aspects described herein relate to a non-transitory computer-readable medium that stores a set of instructions for wireless communication by a UE. The set of instructions, when executed by one or more processors of the UE, may cause the UE to receive one or more downlink reference signals. The set of instructions, when executed by one or more processors of the UE, may cause the UE to transmit a RACH message associated with a RACH procedure using a first RACH configuration or a second RACH configuration based at least in part on whether a measurement of the one or more downlink reference signals satisfies a measurement threshold, wherein the first RACH configuration is associated with repetitions during the RACH procedure and the second RACH configuration is not associated with repetitions during the RACH procedure, and wherein a selection of a RACH configuration, of the first RACH configuration or the second RACH configuration, is evaluated by the UE prior to a transmission of an initial message associated with the RACH procedure.

Some aspects described herein relate to a non-transitory computer-readable medium that stores a set of instructions for wireless communication by a base station. The set of instructions, when executed by one or more processors of the base station, may cause the base station to transmit one or more downlink reference signals intended for a UE. The set of instructions, when executed by one or more processors of the base station, may cause the base station to receive a RACH message associated with a RACH procedure and the UE using a first RACH configuration or a second RACH configuration based at least in part on a measurement threshold, wherein the first RACH configuration is associated with repetitions during the RACH procedure and the second RACH configuration is not associated with repetitions during the RACH procedure.

Some aspects described herein relate to an apparatus for wireless communication. The apparatus may include means for receiving one or more downlink reference signals. The apparatus may include means for transmitting a RACH message associated with a RACH procedure using a first RACH configuration or a second RACH configuration based at least in part on whether a measurement of the one or more downlink reference signals satisfies a measurement threshold, wherein the first RACH configuration is associated with repetitions during the RACH procedure and the second RACH configuration is not associated with repetitions during the RACH procedure, and wherein a selection of a RACH configuration, of the first RACH configuration or the second RACH configuration, is evaluated by the apparatus prior to a transmission of an initial message associated with the RACH procedure.

Some aspects described herein relate to an apparatus for wireless communication. The apparatus may include means for transmitting one or more downlink reference signals intended for a UE. The apparatus may include means for receiving a RACH message associated with a RACH procedure and the UE using a first RACH configuration or a second RACH configuration based at least in part on a measurement threshold, wherein the first RACH configuration is associated with repetitions during the RACH procedure and the second RACH configuration is not associated with repetitions during the RACH procedure.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
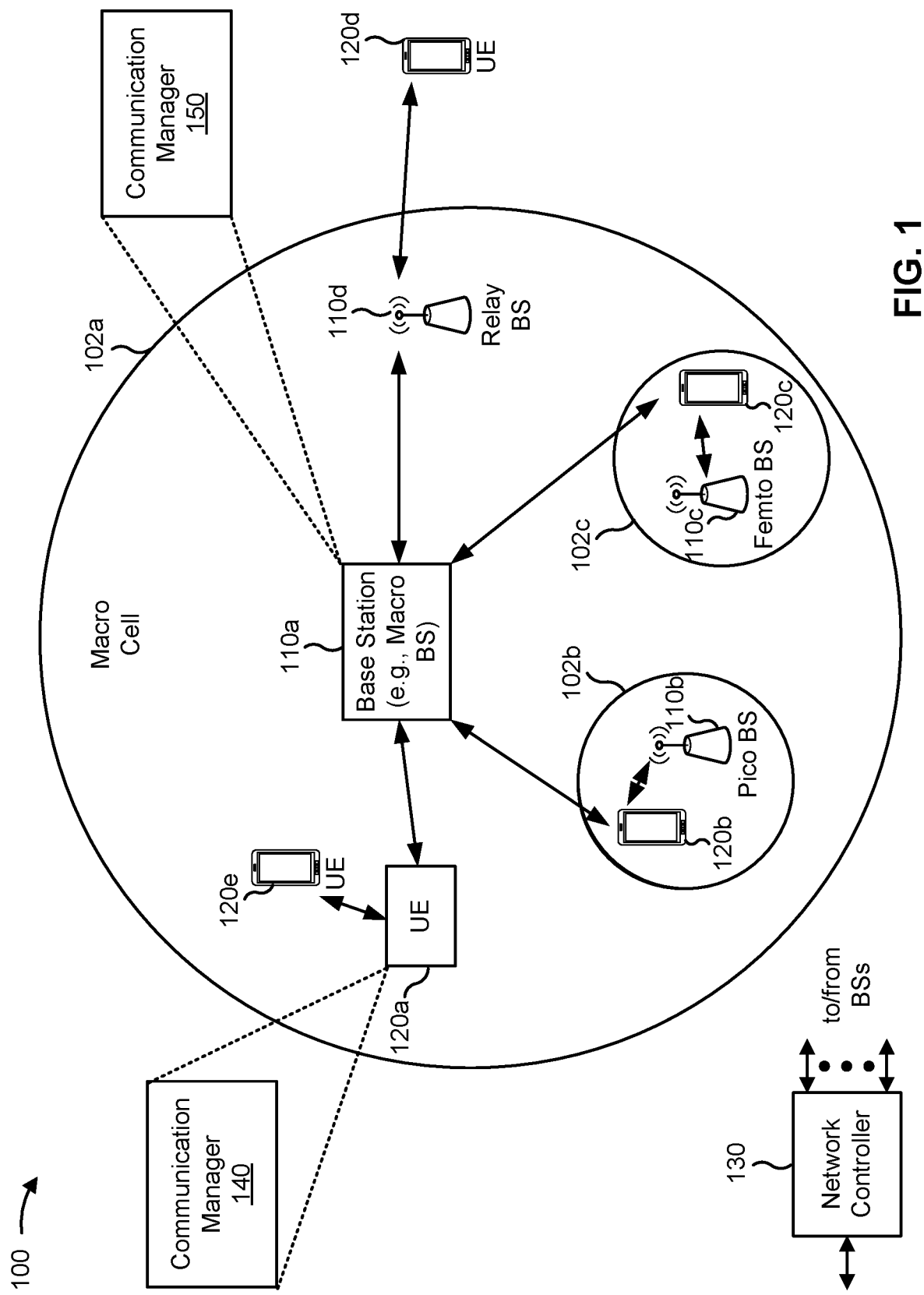
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network node" or "network entity" may refer to an aggregated base station, a disaggregated base station (e.g., described in connection with FIG. 9), an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive one or more downlink reference signals; and transmit a random access channel (RACH) message associated with a RACH procedure using a first RACH configuration or a second RACH configuration based at least in part on whether a measurement of the one or more downlink reference signals satisfies a measurement threshold, wherein the first RACH configuration is associated with repetitions during the RACH procedure and the second RACH configuration is not associated with repetitions during the RACH procedure, and wherein a selection of a RACH configuration, of the first RACH configuration or the second RACH configuration, is evaluated by the UE 120 (and/or the communication manager 140) prior to a transmission of an initial message associated with the RACH procedure. Additionally, or alternatively, the communication manager 140 may perform one or more other operations described herein.

In some aspects, the base station 110 may include a communication manager 150. As described in more detail elsewhere herein, the communication manager 150 may transmit one or more downlink reference signals intended for a UE; and receive a RACH message associated with a RACH procedure and the UE using a first RACH configuration or a second RACH configuration based at least in part on a measurement threshold, wherein the first RACH configuration is associated with repetitions during the RACH procedure and the second RACH configuration is not associated with repetitions during the RACH procedure. Additionally, or alternatively, the communication manager 150 may perform one or more other operations described herein.

As indicated above, FIG. 1 is provided as an example. Other examples may differ from what is described with regard to FIG. 1.

Figure 2:
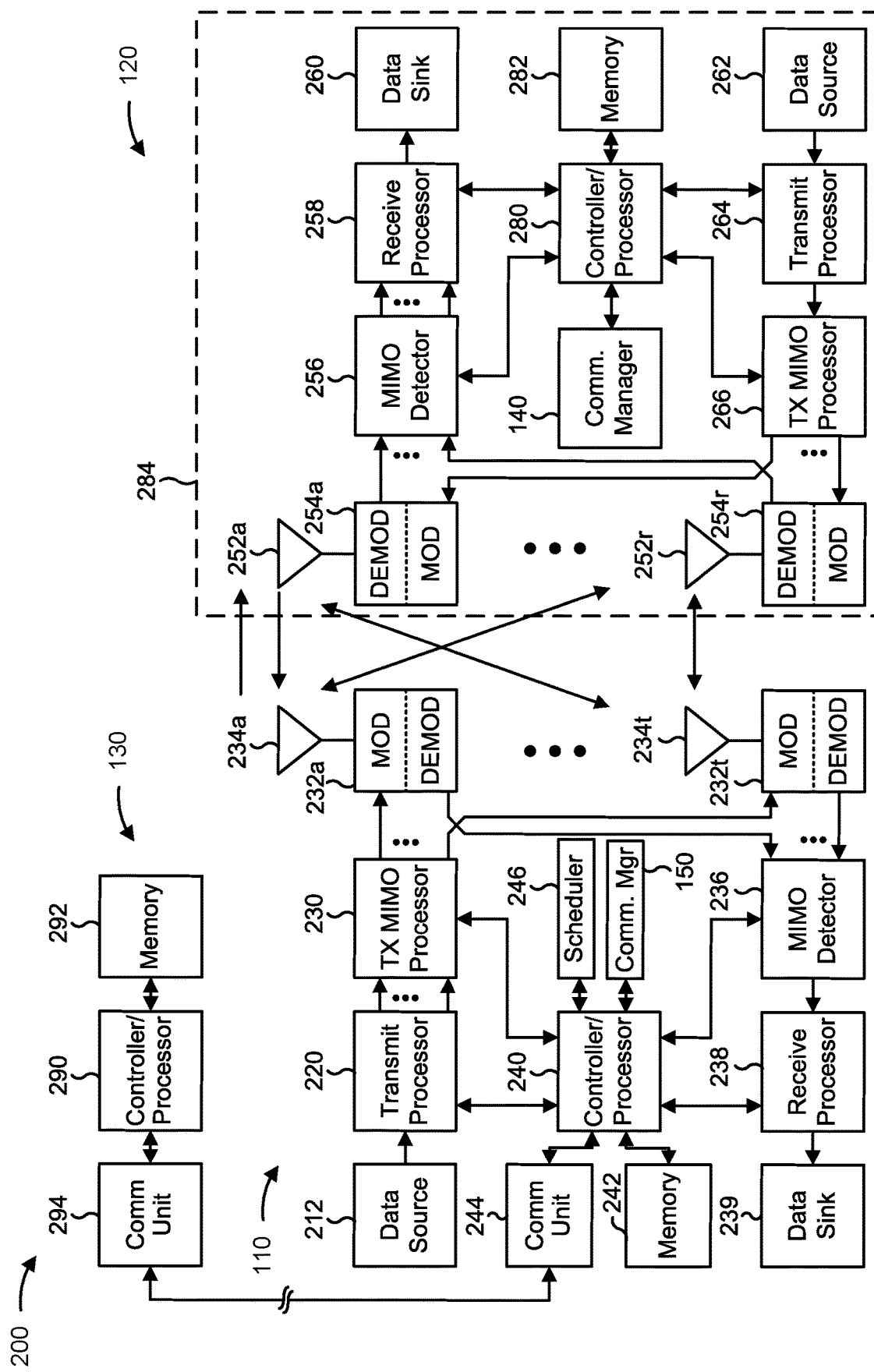
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-10).

The controller/processor 240 of the base station 110, the controller/processor 280 of the UE 120, and/or any other component(s) of FIG. 2 may perform one or more techniques associated with RACH procedure type selection, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving one or more downlink reference signals; and/or means for transmitting a RACH message associated with a RACH procedure using a first RACH configuration or a second RACH configuration based at least in part on whether a measurement of the one or more downlink reference signals satisfies a measurement threshold, wherein the first RACH configuration is associated with repetitions during the RACH procedure and the second RACH configuration is not associated with repetitions during the RACH procedure, and wherein a selection of a RACH configuration, of the first RACH configuration or the second RACH configuration, is evaluated by the UE prior to a transmission of an initial message associated with the RACH procedure. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting one or more downlink reference signals intended for a UE; and/or means for receiving a RACH message associated with a RACH procedure and the UE using a first RACH configuration or a second RACH configuration based at least in part on a measurement threshold, wherein the first RACH configuration is associated with repetitions during the RACH procedure and the second RACH configuration is not associated with repetitions during the RACH procedure. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), TRP, or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

Figure 3:
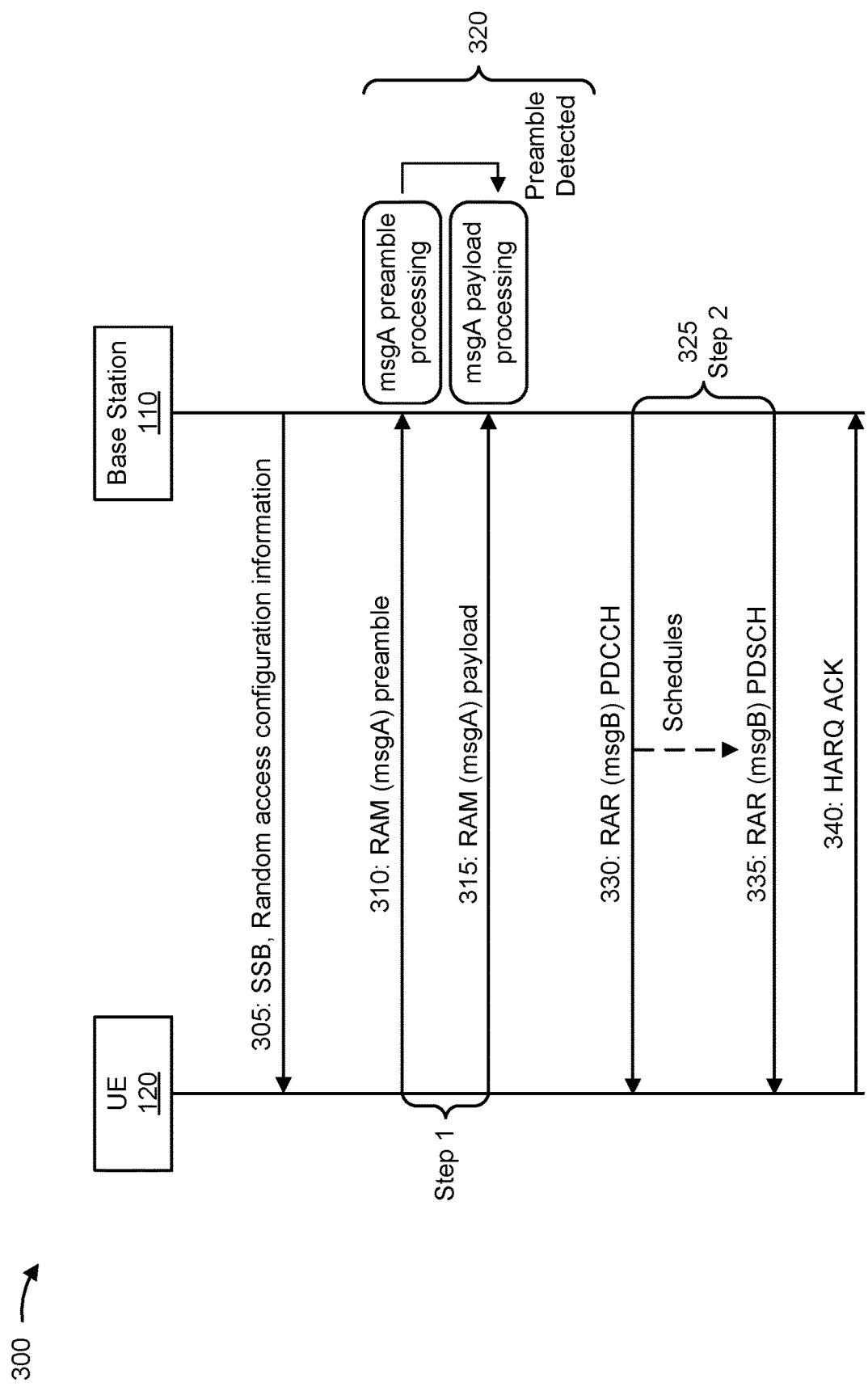
FIG. 3 is a diagram illustrating an example of a two-step random access procedure, in accordance with the present disclosure.

FIG. 3 is a diagram illustrating an example 300 of a two-step random access procedure, in accordance with the present disclosure. As shown in FIG. 3, a base station 110 and a UE 120 may communicate with one another to perform the two-step random access procedure. A random access procedure may be referred to herein as a RACH procedure.

As shown by reference number 305, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the two-step random access procedure, such as one or more parameters for transmitting a random access message (RAM) and/or receiving a random access response (RAR) to the RAM.

As shown by reference number 310, the UE 120 may transmit, and the base station 110 may receive, a RAM preamble. As shown by reference number 315, the UE 120 may transmit, and the base station 110 may receive, a RAM payload. As shown, the UE 120 may transmit the RAM preamble and the RAM payload to the base station 110 as part of an initial (or first) step of the two-step random access procedure. In some aspects, the RAM may be referred to as message A, msgA, a first message, or an initial message in a two-step random access procedure. Furthermore, in some aspects, the RAM preamble may be referred to as a message A preamble, a msgA preamble, a preamble, or a physical random access channel (PRACH) preamble, and the RAM payload may be referred to as a message A payload, a msgA payload, or a payload. In some aspects, the RAM may include some or all of the contents of message 1 (msg1) and message 3 (msg3) of a four-step random access procedure, which is described in more detail below. For example, the RAM preamble may include some or all contents of message 1 (e.g., a PRACH preamble), and the RAM payload may include some or all contents of message 3 (e.g., a UE identifier, uplink control information (UCI), and/or a physical uplink shared channel (PUSCH) transmission).

As shown by reference number 320, the base station 110 may receive the RAM preamble transmitted by the UE 120. If the base station 110 successfully receives and decodes the RAM preamble, the base station 110 may then receive and decode the RAM payload.

As shown by reference number 325, the base station 110 may transmit an RAR (sometimes referred to as an RAR message). As shown, the base station 110 may transmit the RAR message as part of a second step of the two-step random access procedure. In some aspects, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, and/or contention resolution information.

As shown by reference number 330, as part of the second step of the two-step random access procedure, the base station 110 may transmit a PDCCH communication for the RAR. The PDCCH communication may schedule a physical downlink shared channel (PDSCH) communication that includes the RAR. For example, the PDCCH communication may indicate a resource allocation (e.g., in downlink control information (DCI)) for the PDSCH communication.

As shown by reference number 335, as part of the second step of the two-step random access procedure, the base station 110 may transmit the PDSCH communication for the RAR, as scheduled by the PDCCH communication. The RAR may be included in a medium access control (MAC) protocol data unit (PDU) of the PDSCH communication. As shown by reference number 340, if the UE 120 successfully receives the RAR, the UE 120 may transmit a hybrid automatic repeat request (HARD) acknowledgement (ACK).

As indicated above, FIG. 3 is provided as an example. Other examples may differ from what is described with regard to FIG. 3.

Figure 4:
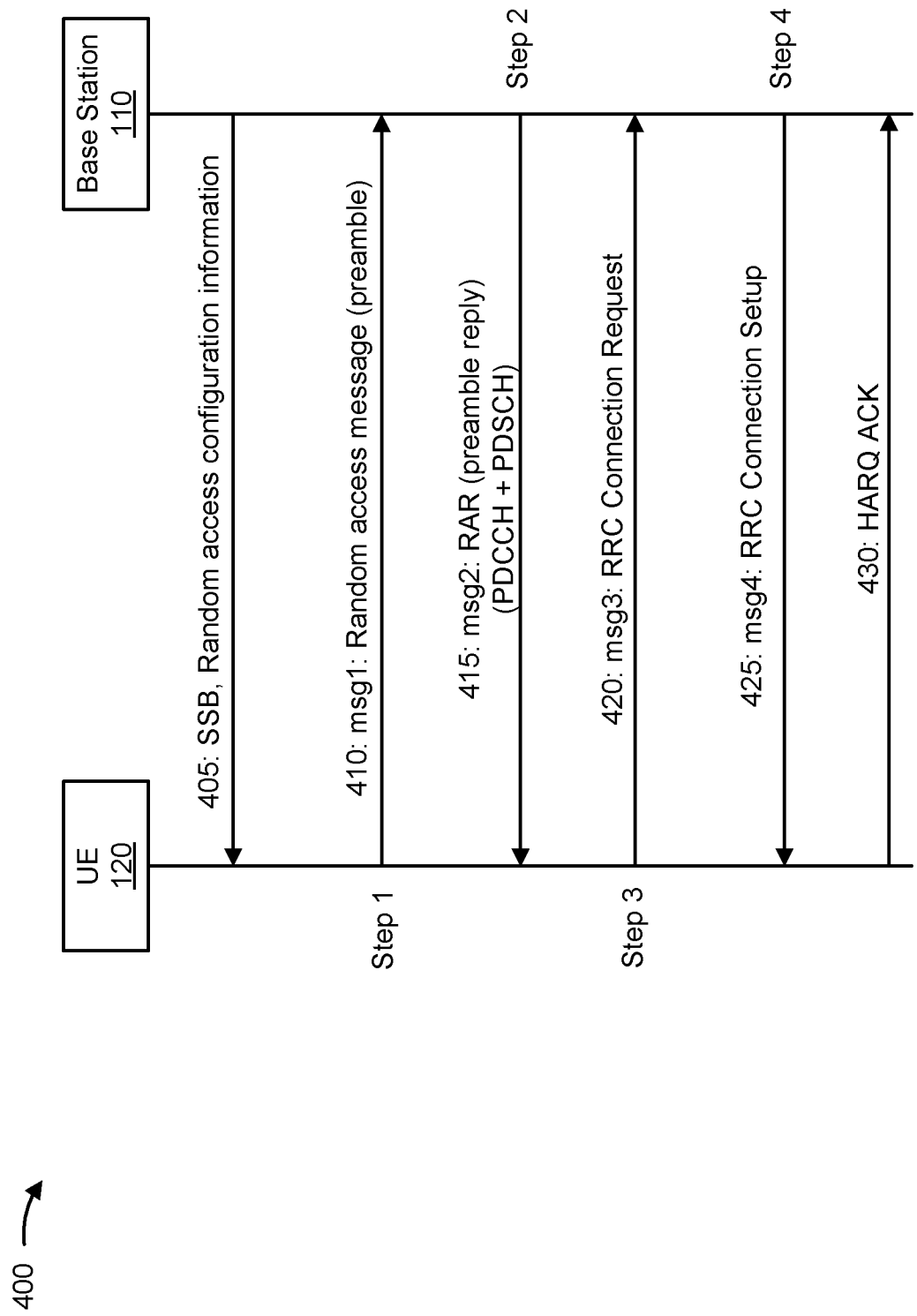
FIG. 4 is a diagram illustrating an example of a four-step random access procedure, in accordance with the present disclosure.

FIG. 4 is a diagram illustrating an example 400 of a four-step random access procedure, in accordance with the present disclosure. As shown in FIG. 4, a base station 110 and a UE 120 may communicate with one another to perform the four-step random access procedure.

As shown by reference number 405, the base station 110 may transmit, and the UE 120 may receive, one or more SSBs and random access configuration information. In some aspects, the random access configuration information may be transmitted in and/or indicated by system information (e.g., in one or more SIBs) and/or an SSB, such as for contention-based random access. Additionally, or alternatively, the random access configuration information may be transmitted in an RRC message and/or a PDCCH order message that triggers a RACH procedure, such as for contention-free random access. The random access configuration information may include one or more parameters to be used in the random access procedure, such as one or more parameters for transmitting a RAM and/or one or more parameters for receiving an RAR.

In some examples, the random access configuration information may indicate that one or more messages associated with the four-step random access procedure may be transmitted by the UE 120 with repetitions. As used herein, "repetition" may refer to a communication that is transmitted more than one time and includes the initial transmission of that communication as well as each subsequent transmission of that communication (e.g., 4 repetitions may refer to an initial transmission and 3 repeated transmissions of the initial transmission). The random access configuration may indicate that the UE 120 may transmit repetitions of an RRC connection request message (e.g., a msg3, described below) to improve reliability of the RRC connection request message for UEs experiencing poor channel conditions (e.g., for UEs that measure an RSRP of a reference signal or an SSB transmitted by the base station 110 that is less than a threshold).

As shown by reference number 410, the UE 120 may transmit a RAM, which may include a preamble (sometimes referred to as a random access preamble, a PRACH preamble, or a RAM preamble). The message that includes the preamble may be referred to as a message 1, msg1, MSG1, a first message, or an initial message in a four-step random access procedure. The random access message may include a random access preamble identifier. In some examples, resources used by the UE 120 to transmit the RAM (e.g., the msg1) may indicate to the base station 110 whether the UE 120 needs to transmit the RRC connection request message (e.g., a msg3) with repetitions. For example, the random access configuration information may indicate that some resources or RAM preambles (e.g., some RACH occasions) are to be used by the UE 120 to indicate a request for additional uplink resources to transmit repetitions of a msg3 associated with the four-step RACH procedure.

As shown by reference number 415, the base station 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some examples, as part of the second step of the four-step random access procedure, the base station 110 may transmit a PDCCH communication for the RAR. The PDCCH communication may schedule a PDSCH communication that includes the RAR. For example, the PDCCH communication may indicate a resource allocation for the PDSCH communication. Also as part of the second step of the four-step random access procedure, the base station 110 may transmit the PDSCH communication for the RAR, as scheduled by the PDCCH communication. The RAR may be included in a MAC PDU of the PDSCH communication. In some examples, as part of the second step of the four-step random access procedure, the base station 110 may grant uplink resources for repetitions of a msg3 associated with the four-step RACH procedure. For example, the base station 110 may schedule one or more repetitions of an RRC connection request message (e.g., in response to a request from the UE 120, such as the UE 120 transmitting the msg1 using a RACH occasion that is associated with requesting msg3 repetitions). The PDCCH communication may indicate resources to be used for the UE 120 to transmit repetitions of the msg3 as well as a number of repetitions (e.g., 2, 4, 8, or another number of repetitions) of the msg3 to be transmitted by the UE 120.

As shown by reference number 420, the UE 120 may transmit an RRC connection request message. The RRC connection request message may be referred to as message 3, msg3, MSG3, or a third message of a four-step random access procedure. In some aspects, the RRC connection request may include a UE identifier, UCI, and/or a PUSCH communication (e.g., an RRC connection request). In some examples, the UE 120 may transmit multiple repetitions (e.g., in initial transmission and one or more repeated transmissions) of the RRC connection request message to improve a reliability of the RRC connection request message.

As shown by reference number 425, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information. As shown by reference number 430, if the UE 120 successfully receives the RRC connection setup message, then the UE 120 may transmit a HARQ ACK. If the UE 120 does not successfully receive the RRC connection setup message (e.g., the msg4), then the UE 120 may attempt to perform the four-step random access procedure again. For example, the UE 120 may transmit another initial message (e.g., another msg1). The additional transmission of the initial message may be referred to herein as a repetition of the initial message or a repetition of the msg1. However, the repetition of the initial message may occur in a separate iteration of the four-step RACH procedure. An "iteration" of a random access procedure may refer to the UE 120 and the base station 110 performing operations associated with a series of steps (e.g., steps 1 through 4 of the four-step RACH procedure) of the random access procedure. For example, each time the UE 120 transmits an initial message (e.g., a msg1) of the random access procedure, a new iteration of the random access procedure may begin. The UE 120 may retransmit the initial message (e.g., a msg1) (e.g., to begin a new iteration of the random access procedure) based on failing to detect or receive the RAR (e.g., the msg2) that includes the preamble identifier transmitted by the UE 120 in the initial message or based on failing to detect or receive the RRC connection setup message that includes the UE identifier associated with the UE 120.

In some examples, the initial message (e.g., the msg1) may have a higher reliability than a reliability of the RRC connection request message (e.g., the msg3). This is because the initial message may be transmitted using a random preamble sequence, some of which may result in transmissions that span multiple symbols and/or multiple slots, whereas the RRC connection request message is a single PUSCH uplink transmission. Therefore, the reliability of the RRC connection request message may correlate to a wireless coverage of the cell (e.g., a more reliable msg3 may result in improved coverage for a cell associated with the base station 110). Therefore, as described elsewhere herein, the UE 120 may transmit repetitions of the msg3 to improve reliability of the msg3 and to improve coverage for the cell. A RACH procedure that is associated with repetitions (e.g., repetitions of the msg3) may be referred to herein as a "coverage enhanced (CovEnh) (CE) RACH procedure type." For example, a coverage enhanced RACH procedure type may be associated with two or more transmissions of a msg3 during each iteration of the RACH procedure. A RACH procedure that is not associated with repetitions during the RACH procedure (e.g., a RACH procedure that does not include repetitions of the msg3) may be referred to herein as a "legacy RACH procedure type" or a "traditional RACH procedure type." For example, a legacy or traditional RACH procedure type may be associated with a single transmission of msg1 and a single transmission of msg3 during each iteration of the RACH procedure.

Therefore, in some cases, the UE 120 may be capable of performing coverage enhanced RACH procedures or legacy or traditional RACH procedures. However, it may be unclear as to how and/or when the UE 120 is to make a determination or selection to use a coverage enhanced RACH procedure or legacy RACH procedure. For example, the UE 120 may select the coverage enhanced RACH procedure or the traditional RACH procedure based on channel conditions. However, channel conditions experienced by the UE 120 may vary over time (e.g., channel conditions may vary while the UE 120 is performing the RACH procedure or between iterations of the RACH procedure). Therefore, if the UE 120 selects a coverage enhanced RACH procedure and channel conditions improve, the UE 120 may consume additional resources associated with repetitions of the msg3 repetitions. As another example, if the UE 120 selects a legacy or traditional RACH procedure and channel conditions degrade, then a likelihood that the UE 120 is able to successfully complete the RACH procedure may decrease.

Some techniques and apparatuses described herein enable RACH procedure type selection. For example, some techniques and apparatuses described herein a UE 120 to select a RACH procedure type (e.g., a coverage enhanced RACH procedure with msg3 repetitions or a legacy RACH procedure without msg3 repetitions) for a RACH procedure (or for an iteration of a RACH procedure). "RACH procedure type" and "RACH configuration" may be used interchangeably herein. For example, the selection of the RACH procedure type may be based at least in part on a measurement of a reference signal transmitted by the base station 110 (e.g., a downlink path loss reference signal). In some aspects, the UE 120 may evaluate the measurement(s) of the reference signal once, such as when a RACH procedure is triggered (e.g., before transmitting the initial message or the msg1). If the measurement satisfies a measurement threshold, then the UE 120 may select the legacy RACH procedure without msg3 repetitions. If the measurement does not satisfy the measurement threshold, then the UE 120 may select the coverage enhanced RACH procedure with msg3 repetitions. The UE 120 may continue to use the selected RACH procedure type until completion criteria (e.g., described in more detail elsewhere herein) associated with the RACH procedure are met (e.g., the UE 120 may use the selected RACH procedure type for all iterations of the RACH procedure).

In some other aspects, the UE 120 may evaluate the measurement(s) of the reference signal prior to a first transmission of the initial message (e.g., the msg1) and prior to each subsequent transmission (e.g., retransmission) of the initial message. The UE 120 may select a RACH procedure type based at least in part on the measurement(s) of the reference signal at the times when the evaluations are made by the UE 120. In other words, the UE 120 may evaluate reference signal measurement(s) and select a RACH procedure type prior to starting each iteration of the RACH procedure.

In some aspects, the UE 120 may evaluate the measurement(s) of the reference signal prior to a first transmission of the initial message (e.g., the msg1). If the UE 120 selects the coverage enhanced RACH procedure with msg3 repetitions (e.g., based at least in part on the measurement(s) of the reference signal prior to a first transmission of the initial message when the RACH procedure is triggered), then the UE 120 may use the coverage enhanced RACH procedure type until the completion criteria associated with the RACH procedure are met. If the UE 120 selects the legacy RACH procedure without msg3 repetitions (e.g., based at least in part on the measurement(s) of the reference signal prior to a first transmission of the initial message when the RACH procedure is triggered), then the UE 120 may evaluate the measurement(s) of the reference signal prior to each subsequent transmission (e.g., retransmission) of the initial message (e.g., the msg1). If the UE 120 selects the coverage enhanced RACH procedure with msg3 repetitions for a subsequent transmission (e.g., retransmission) of the initial message (e.g., after using the legacy RACH procedure type for a previous iteration of the RACH procedure), then the UE 120 may use the coverage enhanced RACH procedure type until the completion criteria associated with the RACH procedure are met.

In some aspects, if the UE 120 selects the legacy RACH procedure without msg3 repetitions (e.g., based at least in part on the measurement(s) of the reference signal prior to a first transmission of the initial message when the RACH procedure is triggered), then the UE 120 may attempt to complete the RACH procedure. If a number of iterations performed or a number of initial messages (e.g., msg1) transmitted by the UE 120 (e.g., without successfully completing the RACH procedure) satisfies a threshold, then the UE 120 may select the (or switch to) the coverage enhanced RACH procedure type (e.g., without performing additional measurements or evaluations of measurements). Alternatively, if the number of iterations performed or the number of initial messages (e.g., msg1) transmitted by the UE 120 (e.g., without successfully completing the RACH procedure) satisfies the threshold, then the UE 120 may measure and/or evaluate measurement(s) of a downlink reference to select the RACH procedure type to be used by the UE 120 for future iterations of the RACH procedure.

As a result, the UE 120 may be enabled to evaluate and select a RACH procedure type based on current and/or changing channel conditions. This may conserve resources that would have otherwise been used by the UE 120 and/or the base station 110 performing a RACH procedure that is associated with repetitions (e.g., msg3 repetitions) when channel conditions improve such that the coverage enhanced RACH procedure is no longer needed. Additionally, this may improve cell coverage and a likelihood that the UE 120 is able to successfully complete the RACH procedure by enabling the UE 120 to select and/or switch to the coverage enhanced RACH procedure with msg3 repetitions based at least in part on channel conditions experienced by the UE 120. Moreover, some techniques and apparatuses described herein provide improved clarity for the UE 120 for making RACH procedure type selections.

As indicated above, FIG. 4 is provided as an example. Other examples may differ from what is described with regard to FIG. 4.

Figure 5:
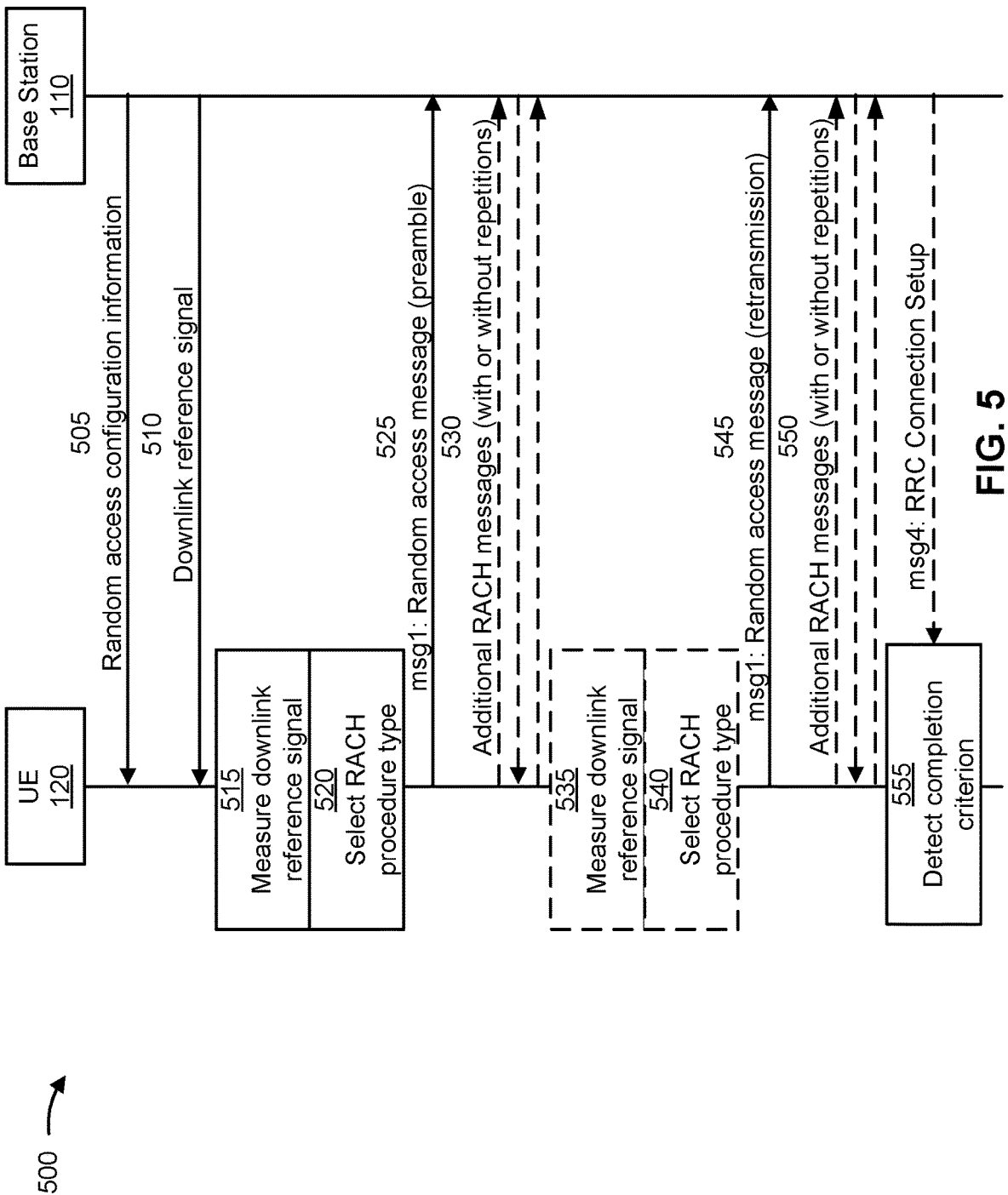
FIG. 5 is a diagram illustrating an example of random access channel (RACH) procedure type selection, in accordance with the present disclosure.

FIG. 5 is a diagram illustrating an example 500 of RACH procedure type selection, in accordance with the present disclosure. As shown in FIG. 5, a UE (e.g., UE 120) may communicate (e.g., transmit an uplink transmission and/or receive a downlink transmission) with a base station (e.g., base station 110). The UE 120 and the base station 110 may be part of a wireless network (e.g., the wireless network 100).

As shown by reference number 505, the base station 110 may transmit (e.g., using controller/processor 240, transmit processor 220, TX MIMO processor 230, MOD 232, antenna 234, and/or memory 242), and the UE 120 may receive (e.g., using antenna 252, DEMOD 254, MIMO detector 256, receive processor 258, controller/processor 280, and/or memory 282), configuration information. In some aspects, the UE 120 may receive configuration information from another device (e.g., from another base station or another UE). In some aspects, the UE 120 may receive the configuration information via system information signaling (e.g., one or more SIBs), one or more SSBs, RRC signaling and/or MAC signaling (e.g., MAC control elements (MAC-CEs)). In some aspects, the configuration information may include an indication of one or more configuration parameters (e.g., already known to the UE 120) for selection by the UE 120 and/or explicit configuration information for the UE to use to configure itself.

In some aspects, the configuration information may be random access configuration information (e.g., RACH configuration information). In some aspects, the configuration information may indicate that the UE 120 is to select a RACH procedure type (e.g., from a RACH procedure associated with repetitions, such as msg3 repetitions, or a RACH procedure type that is not associated with repetitions). For example, the UE 120 may be configured to select a RACH procedure type based at least in part on one or more measurements of a downlink reference signal, such as a pathloss reference signal or another downlink reference signal. In some aspects, the configuration information may indicate a timing for when the UE 120 is to evaluate reference signal measurement(s) and select the RACH procedure type. For example, in some aspects, the configuration information may indicate that the UE 120 is measure the reference signal(s) and select a RACH procedure type once, such as prior to transmitting an initial transmission (e.g., a msg1) associated with the RACH procedure. In some other aspects, the configuration information may indicate that the UE 120 is measure the reference signal(s) and select a RACH procedure type prior to each transmission (or retransmission) of the initial message (e.g., the msg1). In some aspects, the configuration information may indicate that the UE 120 is measure the reference signal(s) and select a RACH procedure type if a previous iteration of the RACH procedure (e.g., a previous msg1 or msg3 transmission by the UE 120) used a legacy RACH configuration that is not associated with repetitions. In some aspects, the configuration information may indicate that the UE 120 is measure the reference signal(s) and select a RACH procedure type based at least in part on a quantity of iterations of the RACH procedure (e.g., a quantity of msg1 transmissions) performed by the UE 120 (e.g., using a legacy RACH configuration that is not associated with repetitions).

In some aspects, the configuration information may indicate a first RACH configuration (e.g., associated with a first RACH procedure type, such as the coverage enhanced RACH procedure type) and a second RACH configuration (e.g., associated with a second RACH procedure type, such as the traditional or legacy RACH procedure type). For example, the first RACH configuration may be associated with repetitions during the RACH procedure. In some aspects, the first RACH configuration may be associated with two or more transmissions (e.g., repetitions) of a msg3 during each iteration of a RACH procedure. In some aspects, the second RACH configuration may not be associated with repetitions during the RACH procedure. For example, the second RACH configuration may be associated with a single transmission of a msg1 and a single transmissions of a msg3 during each iteration of the RACH procedure.

As used herein, a repetition of a RACH message may refer to a repetition of the RACH message during the same iteration of the RACH procedure (e.g., during an iteration of a RACH procedure, the UE 120 may transmit multiple repetitions of the msg3). For example, a repetition of a RACH message may be another transmission of the same RACH message during the same iteration or attempt of the RACH procedure. As used herein, a retransmission of a RACH message may refer to a transmission of the RACH message in a different iteration of the RACH procedure. For example, the UE 120 may transmit a first transmission of a msg1 during a first iteration or attempt of the RACH procedure. If the first iteration or attempt of the RACH procedure fails, then the UE 120 may transmit a retransmission of the msg1 in a new or different iteration or attempt of the RACH procedure.

In some aspects, the configuration information may indicate one or more threshold values. For example, the configuration information may indicate a value for a measurement threshold (e.g., to be used by the UE 120 select between a coverage enhanced RACH configuration or a legacy RACH configuration). As another example, the configuration information may indicate a value for a threshold associated with a quantity of iterations of the RACH procedure (e.g., a quantity of msg1 transmissions) performed by the UE 120. Additionally, or alternatively, a value for one or more thresholds described herein may be hardcoded or preconfigured at the UE 120. For example, a value for one or more thresholds described herein may be defined, or otherwise fixed, by a wireless communication standard, such as the 3GPP. In some aspects, the configuration information may indicate completion criteria for RACH procedures. The competition criteria may indicate that a RACH procedure is "completed" if the UE 120 receives and decodes an RRC connection setup message (e.g., a msg4) that includes a UE identifier associated with the UE 120 (e.g., a successful RACH procedure) or if a number of iterations performed (e.g., a number of msg1 transmissions by the UE 120) without receiving and decoding an RRC connection setup message (e.g., a msg4) that includes a UE identifier associated with the UE 120 satisfies a threshold (e.g., a failed RACH procedure).

The UE 120 may configure (e.g., using controller/processor 280 and/or memory 282) the UE 120 for communicating with the base station. In some aspects, the UE 120 may configure the UE 120 based at least in part on the configuration information. In some aspects, the UE 120 may be configured to perform one or more operations described herein.

In some aspects, the UE 120 may transmit (e.g., using controller/processor 280, transmit processor 264, TX MIMO processor 266, MOD 254, antenna 252, and/or memory 282), and the base station 110 may receive (e.g., using antenna 234, DEMOD 232, MIMO detector 236, receive processor 238, controller/processor 240, and/or memory 242), an indication of a capability of the UE 120 to communicate (e.g., one or more of uplink transmissions or downlink transmissions) using different RACH procedure types. For example, the UE 120 may indicate a capability of the UE 120 to communicate using a coverage enhanced RACH procedure with msg3 repetitions. In some aspects, the UE 120 may indicate a capability of the UE 120 to perform one or more operations described herein (e.g., to select a RACH procedure type at different times). In some aspects, the UE 120 may transmit the indication via RRC signaling, one or more MAC-CEs, and/or a physical uplink control channel (PUCCH) message, among other examples.

As shown by reference number 510, the base station 110 may transmit (e.g., using controller/processor 240, transmit processor 220, TX MIMO processor 230, MOD 232, antenna 234, and/or memory 242), and the UE 120 may receive (e.g., using antenna 252, DEMOD 254, MIMO detector 256, receive processor 258, controller/processor 280, and/or memory 282), one or more downlink reference signals. A downlink reference signal may be a downlink pathloss reference signal. A downlink pathloss reference signal may be a reference signal configured to be used by the UE 120 to estimate pathloss associated with a downlink channel. For example, the configuration information (e.g., an RRC configuration) may configure reference signal resources to be associated with the downlink pathloss reference signal. The UE 120 may measure reference signal(s) transmitted using the resources to estimate the pathloss associated with a downlink channel. In some aspects, the downlink reference signal may be a downlink pathloss reference signal, an SSB, a channel state information (CSI) reference signal (CSI-RS), and/or another downlink reference signal.

As shown by reference number 515, the UE 120 may measure (e.g., using antenna 252, DEMOD 254, MIMO detector 256, receive processor 258, controller/processor 280, and/or memory 282) one or more downlink reference signals transmitted by the base station 110. For example, the UE 120 may measure the downlink reference signal to obtain a measurement value associated with the downlink reference signal. The measurement value may be an RSRP value, an RSRQ value, and/or a signal-to-interference-plus-noise ratio (SINR) value, among other examples. In some aspects, the UE 120 may measure the downlink reference signal based at least in part on a RACH procedure being triggered. For example, the UE 120 may determine that a RACH procedure is to be performed with the base station 110. Therefore, the UE 120 may measure the downlink reference signal transmitted by the base station 110. In some other aspects, the UE 120 may obtain a most recent measurement value of the downlink reference signal based at least in part a RACH procedure being triggered (e.g., the measurements may be performed in accordance with a measurement configuration and the UE 120 may retrieve a most recent measurement value of the downlink reference signal based at least in part a RACH procedure being triggered).

As shown by reference number 520, the UE 120 may select (e.g., using controller/processor 280 and/or memory 282) a RACH procedure type (e.g., a RACH procedure configuration) to be used for a RACH procedure. For example, the UE 120 may select a RACH procedure type for a first transmission of a RACH message (e.g., for a first transmission of a msg1 or for a first iteration of the RACH procedure). For example, the confirmation information may indicate a first RACH configuration associated with repetitions during a RACH procedure (e.g., a coverage enhanced RACH procedure that is associated with msg3 repetitions) and a second RACH configuration that is not associated with retransmissions during the RACH procedure (e.g., a legacy or traditional RACH procedure that is not associated with msg3 repetitions). The UE 120 may select between the first RACH configuration and the second RACH configuration based at least in part on the measurement value of the downlink reference signal. For example, if the measurement value of the downlink reference signal satisfies a measurement threshold, then the UE 120 may select the second RACH configuration that is not associated with repetitions during the RACH procedure (e.g., the legacy or traditional RACH procedure that is not associated with msg3 repetitions). If the measurement value of the downlink reference signal does not satisfy the measurement threshold, then the UE 120 may select first RACH configuration associated with repetitions during the RACH procedure (e.g., the coverage enhanced RACH procedure that is associated with msg3 repetitions).

The selection of the RACH procedure type (e.g., the RACH procedure configuration) may impact resources used, or a preamble sequence used, for an initial message (e.g., a msg1) of the RACH procedure. For example, as described in more detail elsewhere herein, the configuration information may indicate that some resources (e.g., time domain and/or frequency domain resources), RACH occasions, and/or preamble sequences that are associated with the first RACH configuration (e.g., the enhanced coverage RACH procedure type) and that other resources (e.g., time domain and/or frequency domain resources), RACH occasions, and/or preamble sequences that are associated with the second RACH configuration (e.g., the legacy or traditional RACH procedure type). For example, the UE 120 may indicate to the base station 110 whether msg3 repetitions are to be used based at least in part on the resources (e.g., time domain and/or frequency domain resources), RACH occasion, and/or preamble sequence used for the initial message (e.g., a msg1) of the RACH procedure.

For example, if the initial message uses resources, a RACH occasion, or a preamble sequence associated with the first RACH configuration that is associated with msg3 repetitions, then the base station 110 may transmit, to the UE 120, an uplink grant (e.g., included in a msg2 of the RACH procedure) that includes resources for one or more repetitions of the msg3 associated with the RACH procedure. Alternatively, if the initial message uses resources, a RACH occasion, or a preamble sequence associated with the second RACH configuration that is not associated with msg3 repetitions, then the base station 110 may transmit, to the UE 120, an uplink grant (e.g., included in a msg2 of the RACH procedure) that includes resources for a single transmission (e.g., and no repetitions) of the msg3 associated with the RACH procedure. In this way, the UE 120 may request (e.g., implicitly based on the resources or RACH occasion used to transmit the msg1) repetitions for the msg3 associated with the RACH procedure based at least on part on the RACH configuration, or the RACH procedure type, selected by the UE 120.

In some aspects, the UE 120 may evaluate the measurement value of the downlink reference signal and may select the RACH configuration or RACH procedure type only once (e.g., prior to a first transmission of the initial message associated with the RACH procedure). For example, in some aspects, the RACH configuration or RACH procedure type selected by the UE 120 prior to a first transmission of the initial message associated with the RACH procedure (e.g., when, or near when, the RACH procedure is triggered) may be used by the UE 120 until the UE 120 detects that a completion criterion associated with the RACH procedure is met. In other words, the UE 120 may use the selected RACH configuration or RACH procedure type for all iterations (if more than one) of the RACH procedure. This may reduce a complexity associated with selecting the RACH procedure because the UE 120 may not be required to make multiple evaluations or selections of the RACH configuration or RACH procedure type used by the UE 120.

As shown by reference number 525, the UE 120 may transmit (e.g., using controller/processor 280, transmit processor 264, TX MIMO processor 266, MOD 254, antenna 252, and/or memory 282), and the base station 110 may receive (e.g., using antenna 234, DEMOD 232, MIMO detector 236, receive processor 238, controller/processor 240, and/or memory 242), a RACH message associated with the RACH procedure using the first RACH configuration or the second RACH configuration based at least in part on whether a measurement value of the downlink reference signal satisfies the measurement threshold. For example, the UE 120 may transmit, and the base station 110 may receive, the RACH message using the first RACH configuration (e.g., the enhanced coverage RACH procedure type) based at least in part on the measurement value not satisfying the measurement threshold. Alternatively, the UE 120 may transmit, and the base station 110 may receive, the RACH message using the second RACH configuration (e.g., the legacy or traditional RACH procedure type) based at least in part on the measurement value satisfying the measurement threshold. "RACH message" may refer to a message associated with a RACH procedure. For example, as shown in FIG. 5, the RACH message may be an initial message or a msg1 of a four-step RACH procedure. As another example, the RACH message may be a msg3 of a four-step RACH procedure.

For example, the UE 120 may transmit the initial message or a msg1 of a four-step RACH procedure using resources (e.g., time domain and/or frequency domain resources), RACH occasions, and/or preamble sequences that are associated with the first RACH configuration (e.g., the enhanced coverage RACH procedure type) if the first RACH configuration is selected by the UE 120 (e.g., to request an uplink grant for repetitions of the msg3). This may indicate to the base station 110 that resources (e.g., an uplink grant) is needed for repetitions of the msg3 of the four-step RACH procedure. Alternatively, the UE 120 may transmit the initial message or a msg1 of a four-step RACH procedure using resources (e.g., time domain and/or frequency domain resources), RACH occasions, and/or preamble sequences that are associated with that are associated with the second RACH configuration (e.g., the legacy or traditional RACH procedure type) if the second RACH configuration is selected by the UE 120. This may indicate to the base station 110 that resources (e.g., an uplink grant) are only needed for a single transmission of the msg3 of the four-step RACH procedure. The base station 110 may determine an uplink grant for the msg3 based at least in part on the RACH configuration selected by the UE 120 for the msg1.

As shown by reference number 530, the UE 120 and the base station 110 may exchange additional RACH messages associated with the RACH procedure. For example, the base station 110 may transmit, and the UE 120 may receive an RAR (e.g., a msg2) as a reply to the initial message (e.g., the msg1). The UE 120 may transmit, and the base station 110 may receive, an RRC connection request message (e.g., a msg3). For example, the UE 120 may transmit the RRC connection request message if the UE 120 detects an RAR that includes a preamble identifier of a preamble sequence used by the UE 120 for the initial message (e.g., the msg1). If the first RACH configuration (e.g., the enhanced coverage RACH procedure type) is selected by the UE 120, then the UE 120 may transmit multiple repetitions of the RRC connection request message (e.g., the msg3). Alternatively, if the second RACH configuration (e.g., the legacy or traditional RACH procedure type) is selected by the UE 120, then the UE 120 may transmit a single RRC connection request message (e.g., a single msg3 with no repetitions). In other words, the UE 120 and the base station 110 may perform the RACH procedure using the first RACH configuration or the second RACH configuration based at least in part on the measurement value of the downlink reference signal.

In some aspects, a RACH procedure may fail or may not be successfully completed. For example, the UE 120 may not receive or detect an RAR (e.g., a msg2) that includes a preamble identifier of a preamble sequence used by the UE 120 for the initial message (e.g., the msg1). Additionally, the UE 120 may not receive an RRC connection setup message (e.g., a msg4) that includes a UE identifier associated with the UE 120. In such examples, the UE 120 may attempt to perform the RACH procedure again by transmitting another transmission of the initial message (e.g., the msg1). In other words, the UE 120 may perform another iteration of the RACH procedure if the previous iteration was not successful.

In some aspects, the UE 120 may use the RACH configuration or the RACH procedure type selected by the UE 120 (e.g., as described above in connection with reference number 520) for subsequent transmissions of the initial message (e.g., the msg1). For example, regardless of whether the enhanced coverage RACH procedure type or the legacy RACH procedure type was selected by the UE 120, the UE 120 may use the RACH configuration or the RACH procedure type selected by the UE 120 for subsequent transmissions of the initial message. In some aspects, the UE 120 may use the RACH configuration or the RACH procedure type selected by the UE 120 (e.g., as described above in connection with reference number 520) for subsequent transmissions of the initial message (e.g., the msg1) based at least in part on a previous msg1 transmission (or a previous iteration of the RACH procedure) using the enhanced coverage RACH procedure type. In other words, in some aspects, if the UE 120 selects the enhanced coverage RACH procedure type with msg3 repetitions (e.g., as described above in connection with reference number 520 or below in connection with reference number 540), then the UE 120 may use the enhanced coverage RACH procedure type with msg3 repetitions for subsequent transmissions of the initial message (e.g., the msg1) and for subsequent iterations of the RACH procedure until a completion criterion is detected by the UE 120.

In some aspects, the UE 120 may evaluate the measurement value of the downlink reference signal(s) and select the RACH configuration or the RACH configuration type prior to each retransmission of the initial message. For example, the measurement value may be evaluated by the UE 120 prior to transmitting an initial message (e.g., a msg1) associated with the RACH procedure and prior to each retransmission of the initial message to select a RACH configuration or RACH procedure type to be associated with an iteration of the RACH procedure. For example, as shown by reference number 535, the UE 120 may measure a downlink reference signal transmitted by the base station 110. For example, the UE 120 may measure the downlink reference signal to obtain a measurement value associated with the downlink reference signal. In some aspects, the UE 120 may measure the downlink reference signal based at least in part on a selection of the RACH configuration being triggered. For example, the UE 120 may determine that a RACH configuration or RACH procedure type is to be selected by the UE 120. Therefore, the UE 120 may measure the downlink reference signal transmitted by the base station 110. In some other aspects, the UE 120 may obtain a most recent measurement value of the downlink reference signal based at least in part a selection of the RACH configuration being triggered (e.g., the measurements may be performed in accordance with a measurement configuration and the UE 120 may retrieve a most recent measurement value of the downlink reference signal based at least in part a selection of the RACH configuration being triggered).

As shown by reference number 540, the UE 120 may select (e.g., using controller/processor 280 and/or memory 282) a RACH procedure type (e.g., a RACH procedure configuration) to be used for the RACH procedure. For example, the UE 120 may select a RACH procedure type for a retransmission of the initial message of the RACH procedure. The UE 120 may select between the first RACH configuration (e.g., the enhanced coverage RACH procedure type) and the second RACH configuration (e.g., the legacy or tradition RACH procedure type) based at least in part on the measurement value of the downlink reference signal (e.g., measured or obtained as described in connection with reference number 535). For example, if the measurement value of the downlink reference signal satisfies a measurement threshold, then the UE 120 may select the second RACH configuration that is not associated with repetitions during the RACH procedure (e.g., the legacy or traditional RACH procedure that is not associated with msg3 repetitions). If the measurement value of the downlink reference signal does not satisfy the measurement threshold, then the UE 120 may select first RACH configuration associated with repetitions during the RACH procedure (e.g., the coverage enhanced RACH procedure that is associated with msg3 repetitions).

In some aspects, the UE 120 may measure (e.g., using antenna 252, DEMOD 254, MIMO detector 256, receive processor 258, controller/processor 280, and/or memory 282) a downlink reference signal and/or may select a RACH procedure type (e.g., as described in connection with reference numbers 535 and 540) prior to each retransmission of the initial message (e.g., the msg1) associated with the RACH procedure. In some aspects, the UE 120 may measure a downlink reference signal and/or may select a RACH procedure type (e.g., as described in connection with reference numbers 535 and 540) based at least in part on a previous transmission of the initial message (e.g., the msg1) being associated with the second RACH configuration (e.g., the traditional or legacy RACH configuration type). For example, if the traditional or legacy RACH configuration type is selected by the UE 120 (for example, as described in connection with reference number 520), then the UE 120 may measure a downlink reference signal and/or may select a RACH procedure type prior to each retransmission of the initial message (e.g., the msg1) associated with the RACH procedure. If the coverage enhanced RACH procedure type is selected by the UE 120 (e.g., in connection with reference number 540 or as part of any other selection by the UE 120), then the UE 120 may cease the evaluation and selection of the RACH procedure type and may continue to use the coverage enhanced RACH procedure type until the RACH procedure is completed. However, if the traditional or legacy RACH configuration type is selected by the UE 120 (e.g., in connection with reference number 540 or as part of any other selection by the UE 120), then the UE 120 continue to measure a downlink reference signal and/or select a RACH procedure type prior to each retransmission of the initial message (e.g., the msg1) associated with the RACH procedure. This may ensure that the UE 120 is enabled to switch to the coverage enhanced RACH procedure type if channel conditions experienced by the UE 120 degrade while the RACH procedure is being performed (e.g., after the RACH procedure is initiated) to improve a likelihood that the RACH procedure is able to be successfully completed.

In some aspects, the UE 120 may select (e.g., using controller/processor 280 and/or memory 282) the first RACH configuration (e.g., the coverage enhanced RACH procedure type) based at least in part on a quantity of iterations (e.g., a quantity of transmissions of the initial message) performed by the UE 120 using the second RACH configuration (e.g., the legacy or traditional RACH procedure type). For example, at the outset of the RACH procedure, the UE 120 may select a RACH procedure type based at least in part on the measurement value of the downlink reference signal (e.g., as described in connection with reference number 520). If the coverage enhanced RACH procedure type is selected by the UE 120, then the UE 120 may use the coverage enhanced RACH procedure type until the RACH procedure is completed (e.g., until the UE 120 detects a completion criterion). However, if the UE 120 selects the legacy or tradition RACH procedure type (e.g., as described in connection with reference number 520), then the UE 120 may use the legacy or tradition RACH procedure type for N iterations of the RACH procedure (e.g., N transmissions of the initial message or the msg1). A value for N may be indicated by the configuration information and/or may be defined, or otherwise fixed, by a wireless communication standard, such as the 3GPP. If the UE 120 does not successfully complete the RACH procedure after N iterations of the RACH procedure (e.g., if the UE 120 does not successfully receive a msg4 that includes a UE identifier associated with the UE 120 after N iterations of the RACH procedure), then the UE 120 may automatically switch to the coverage enhanced RACH procedure type for the remaining iterations of the RACH procedure (e.g., until the UE 120 detects a completion criterion associated with the RACH procedure). For example, the UE 120 may switch to the coverage enhanced RACH procedure type for the remaining iterations of the RACH procedure without performing additional measurements of the downlink reference signal and/or without making additional evaluations or selections for the RACH procedure type to be used by the UE 120. Alternatively, if the UE 120 does not successfully complete the RACH procedure after N iterations of the RACH procedure, then the UE 120 may measure a downlink reference signal and/or may select a RACH procedure type (e.g., as described in connection with reference numbers 535 and 540). For example, the UE 120 may measure a downlink reference signal and/or may select a RACH procedure type (e.g., as described in connection with reference numbers 535 and 540) based at least in part on a quantity of iterations (or a quantity of transmissions of the initial message) performed by the UE 120, without successfully completing the RACH procedure, satisfying a threshold. In other words, in some aspects, the UE 120 may switch the RACH procedure type used to the coverage enhanced RACH procedure type if the UE 120 does not successfully complete the RACH procedure after N iterations of the RACH procedure using the traditional or legacy RACH procedure type. In some other aspects, the UE 120 may reevaluate the RACH procedure type used by the UE 120 (e.g., may perform new measurements and/or new selections of the RACH procedure type) if the UE 120 does not successfully complete the RACH procedure after N iterations of the RACH procedure using the traditional or legacy RACH procedure type.

As shown by reference number 545, the UE 120 may transmit (e.g., using controller/processor 280, transmit processor 264, TX MIMO processor 266, MOD 254, antenna 252, and/or memory 282), and the base station 110 may receive (e.g., using antenna 234, DEMOD 232, MIMO detector 236, receive processor 238, controller/processor 240, and/or memory 242), another RACH message associated with the RACH procedure using the first RACH configuration or the second RACH configuration based at least in part on the selection made by the UE 120 (e.g., as described in connection with reference number 540). For example, the UE 120 may transmit, and the base station 110 may receive, the RACH message using the first RACH configuration (e.g., the enhanced coverage RACH procedure type) based at least in part on an updated or subsequent measurement value of the downlink reference signal not satisfying the measurement threshold. Alternatively, the UE 120 may transmit, and the base station 110 may receive, the RACH message using the second RACH configuration (e.g., the legacy or traditional RACH procedure type) based at least in part on an updated or subsequent measurement value satisfying the measurement threshold.

For example, the UE 120 may transmit the initial message or a msg1 of a four-step RACH procedure using resources (e.g., time domain and/or frequency domain resources), RACH occasions, and/or preamble sequences that are associated with the first RACH configuration (e.g., the enhanced coverage RACH procedure type) if the first RACH configuration is selected by the UE 120. Alternatively, the UE 120 may transmit the initial message or a msg1 of a four-step RACH procedure using resources (e.g., time domain and/or frequency domain resources), RACH occasions, and/or preamble sequences that are associated with that are associated with the second RACH configuration (e.g., the legacy or traditional RACH procedure type) if the second RACH configuration is selected by the UE 120.

As shown by reference number 550, the UE 120 and the base station 110 may exchange additional RACH messages associated with the RACH procedure. For example, the base station 110 may transmit, and the UE 120 may receive an RAR (e.g., a msg2) as a reply to the initial message (e.g., the msg1). The UE 120 may transmit, and the base station 110 may receive, an RRC connection request message (e.g., a msg3). For example, the UE 120 may transmit the RRC connection request message if the UE 120 detects an RAR that includes a preamble identifier of a preamble sequence used by the UE 120 for the initial message (e.g., the msg1). If the first RACH configuration (e.g., the enhanced coverage RACH procedure type) is selected by the UE 120, then the UE 120 may transmit multiple repetitions of the RRC connection request message (e.g., the msg3). Alternatively, if the second RACH configuration (e.g., the legacy or traditional RACH procedure type) is selected by the UE 120, then the UE 120 may transmit a single RRC connection request message (e.g., a single msg3 with no repetitions). In other words, the UE 120 and the base station 110 may perform the RACH procedure using the first RACH configuration or the second RACH configuration based at least in part on the measurement value of the downlink reference signal.

The UE 120 may continue to perform the RACH procedure as described above. For example, the UE 120 may perform selections of the RACH procedure type at different points (or at one point) in time during the RACH procedure, such as prior to each transmission (or retransmission) of the initial message associated with the RACH procedure. The UE 120 may continue to perform the RACH procedure in a similar manner as described herein until a completion criterion is detected by the UE 120. For example, as shown by reference number 555, the UE 120 may detect (e.g., using controller/processor 280 and/or memory 282) a completion criterion associated with the RACH procedure. As described elsewhere herein, "completion criterion" may be a criterion that, when detected by the UE 120, indicates to the UE 120 that the RACH procedure is completed (e.g., and future transmissions of the initial message or other RACH messages should not occur). For example, as shown in FIG. 5, a completion criterion may include the UE 120 receiving a msg4 (e.g., an RRC connection setup message) associated with the RACH procedure that indicates a UE identifier associated with the UE 120 (e.g., the UE identifier may be included in the msg3 associated with the RACH procedure). This may be referred to as a successful RACH procedure. In some aspects, a completion criterion may include detecting that a quantity of iterations (or a quantity of transmissions of the initial message) performed by the UE 120 satisfies a completion threshold. For example, if the quantity of iterations (or the quantity of transmissions of the initial message) performed by the UE 120 without receiving a msg4 that indicates the UE identifier associated with the UE 120 satisfies the competition threshold, then the UE 120 may cease or end the RACH procedure (e.g., this may be referred to as an unsuccessful RACH procedure).

In some aspects, as described in more detail elsewhere herein, the UE 120 may select a RACH procedure type (e.g., the coverage enhanced RACH procedure type with msg3 repetitions or the legacy RACH procedure type without msg3 repetitions) a single time (e.g., prior to a first transmission of the initial message (e.g., msg1) associated with the RACH procedure) and may use the selected RACH procedure type until a completion criterion is detected (e.g., as described in connection with reference number 555). In some other aspects, the UE 120 may select a RACH procedure type (e.g., the coverage enhanced RACH procedure type with msg3 repetitions or the legacy RACH procedure type without msg3 repetitions) prior to a first transmission of the initial message (e.g., msg1) associated with the RACH procedure and prior to each retransmission of the initial message associated with the RACH procedure.

In some aspects, the UE 120 may select a RACH procedure type (e.g., the coverage enhanced RACH procedure type with msg3 repetitions or the legacy RACH procedure type without msg3 repetitions) prior to a first transmission of the initial message (e.g., msg1) associated with the RACH procedure. If the RACH procedure type selected by the UE 120 is the coverage enhanced RACH procedure type with msg3 repetitions, then the UE 120 may use the coverage enhanced RACH procedure type with msg3 repetitions until completion criterion is detected (e.g., as described in connection with reference number 555). If the RACH procedure type selected by the UE 120 is the legacy RACH procedure type without msg3 repetitions, then the UE 120 may continue to evaluate measurement(s) of downlink reference signals and select a RACH procedure type prior to each retransmission of the initial message (e.g., the msg1) associated with the RACH procedure. In some aspects, if at any point the UE 120 selects the coverage enhanced RACH procedure type with msg3 repetitions, then the UE 120 may use the coverage enhanced RACH procedure type with msg3 repetitions until completion criterion is detected (e.g., without performing additional measurements and/or selections of the RACH procedure type).

In some aspects, the UE 120 may select a RACH procedure type (e.g., the coverage enhanced RACH procedure type with msg3 repetitions or the legacy RACH procedure type without msg3 repetitions) prior to a first transmission of the initial message (e.g., msg1) associated with the RACH procedure. If the RACH procedure type selected by the UE 120 is the coverage enhanced RACH procedure type with msg3 repetitions, then the UE 120 may use the coverage enhanced RACH procedure type with msg3 repetitions until completion criterion is detected (e.g., as described in connection with reference number 555). If the RACH procedure type selected by the UE 120 is the legacy RACH procedure type without msg3 repetitions, then the UE 120 may attempt to successfully complete the RACH procedure for N iterations of the RACH procedure (or N transmissions of the initial message). If the UE 120 and the base station 110 are unable to successfully complete the RACH procedure after N iterations of the RACH procedure using the legacy RACH procedure type, then the UE 120 may switch to the coverage enhanced RACH procedure type for future iterations of the RACH procedure and may use the coverage enhanced RACH procedure type with msg3 repetitions until completion criterion is detected. In some aspects, if the UE 120 and the base station 110 are unable to successfully complete the RACH procedure after N iterations of the RACH procedure using the legacy RACH procedure type, then the UE 120 may evaluate measurement(s) of downlink reference signals and select a RACH procedure type prior to next transmission of the initial message (e.g., the msg1) associated with the RACH procedure.

As a result, the UE 120 may be enabled to evaluate and select a RACH procedure type based on current and/or changing channel conditions. This may conserve resources that would have otherwise been used by the UE 120 and/or the base station 110 performing a RACH procedure that is associated with repetitions (e.g., msg3 repetitions) when channel conditions improve such that the coverage enhanced RACH procedure is no longer needed. Additionally, this may improve cell coverage and a likelihood that the UE 120 is able to successfully complete the RACH procedure by enabling the UE 120 to select and/or switch to the coverage enhanced RACH procedure with msg3 repetitions based at least in part on channel conditions experienced by the UE 120. Moreover, this may provide improved clarity for the UE 120 for making RACH procedure type selections, as described herein.

As indicated above, FIG. 5 is provided as an example. Other examples may differ from what is described with regard to FIG. 5.

Figure 6:
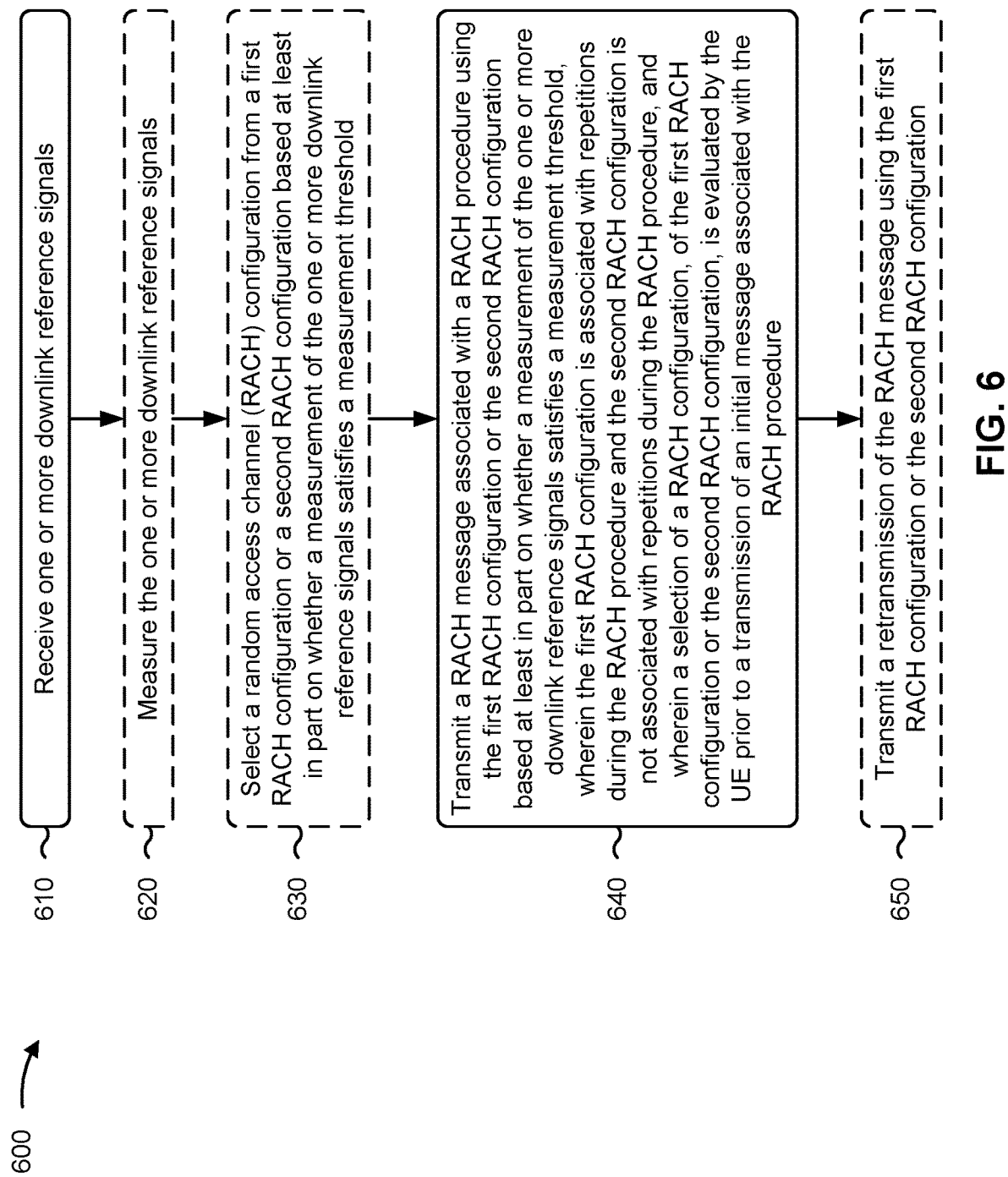
FIGS. 6-8 are diagrams illustrating example processes associated with RACH procedure type selection, in accordance with the present disclosure.

FIG. 6 is a diagram illustrating an example process 600 performed, for example, by a UE, in accordance with the present disclosure. Example process 600 is an example where the UE (e.g., UE 120) performs operations associated with RACH procedure type selection.

As shown in FIG. 6, in some aspects, process 600 may include receiving one or more downlink reference signals (block 610). For example, the UE (e.g., using communication manager 140 and/or reception component 902, depicted in FIG. 9) may receive one or more downlink reference signals, as described above. For example, the UE may receive the one or more downlink reference signals as described in connection with FIG. 5 and reference number 510.

As further shown in FIG. 6, in some aspects, process 600 may optionally include measuring the one or more downlink reference signals (block 620). For example, the UE (e.g., using communication manager 140 and/or measurement component 908, depicted in FIG. 9) may measure the one or more downlink reference signals, as described above. For example, the UE may measure the one or more downlink reference signals as described in connection with FIG. 5 and reference numbers 515 and/or 535.

As further shown in FIG. 6, in some aspects, process 600 may optionally include selecting a RACH configuration from a first RACH configuration or a second RACH configuration based at least in part on whether a measurement of the one or more downlink reference signals satisfies a measurement threshold (block 630). For example, the UE (e.g., using communication manager 140 and/or RACH type selection component 910, depicted in FIG. 9) may select a RACH configuration from a first RACH configuration or a second RACH configuration based at least in part on whether a measurement of the one or more downlink reference signals satisfies a measurement threshold, as described above. For example, the UE may select the RACH configuration as described in connection with FIG. 5 and reference numbers 520 and/or 540.

As further shown in FIG. 6, in some aspects, process 600 may include transmitting, to the base station, a RACH message associated with a RACH procedure using the first RACH configuration or the second RACH configuration based at least in part on whether a measurement of the one or more downlink reference signals satisfies a measurement threshold, wherein the first RACH configuration is associated with repetitions during the RACH procedure and the second RACH configuration is not associated with repetitions during the RACH procedure, and wherein a selection of a RACH configuration, of the first RACH configuration or the second RACH configuration, is evaluated by the UE prior to a transmission of an initial message associated with the RACH procedure (block 640). For example, the UE (e.g., using communication manager 140 and/or transmission component 904, depicted in FIG. 9) may transmit, to the base station, a RACH message associated with a RACH procedure using a first RACH configuration or a second RACH configuration based at least in part on whether a measurement of the one or more downlink reference signals satisfies a measurement threshold, wherein the first RACH configuration is associated with repetitions during the RACH procedure and the second RACH configuration is not associated with repetitions during the RACH procedure, and wherein a selection of a RACH configuration, of the first RACH configuration or the second RACH configuration, is evaluated by the UE prior to a transmission (e.g., a first transmission, an initial transmission, or a retransmission) of an initial message associated with the RACH procedure, as described above. For example, the UE may transmit the RACH message as described in connection with FIG. 5 and reference numbers 525, 530, 545, and/or 550.

As further shown in FIG. 6, in some aspects, process 600 may optionally include transmitting a retransmission of the RACH message using the first RACH configuration or the second RACH configuration (block 650). For example, the UE (e.g., using communication manager 140 and/or transmission component 904, depicted in FIG. 9) may transmit a retransmission of the RACH message using the first RACH configuration or the second RACH retransmission of the RACH message configuration, as described above. For example, the UE may transmit the as described in connection with FIG. 5 and reference numbers 545, and/or 550. In some aspects, the UE may use the same RACH configuration for the initial transmission of the RACH message and the retransmission of the RACH message (e.g., selected at block 630), as described above. In some other aspects, the UE may re-select a RACH configuration, of the first RACH configuration and the second RACH configuration, for the retransmission based at least in part on updated measurement(s) of the one or more downlink reference signals, as described above.

Process 600 may include additional aspects, such as any single aspect or any combination of aspects described below and/or in connection with one or more other processes described elsewhere herein.

In a first aspect, process 600 includes receiving RACH configuration information indicating the first RACH configuration and the second RACH configuration.

In a second aspect, alone or in combination with the first aspect, process 600 includes performing the RACH procedure using the first RACH configuration or the second RACH configuration based at least in part on the measurement of the one or more downlink reference signals, wherein performing the RACH procedure includes transmitting the RACH message.

In a third aspect, alone or in combination with one or more of the first and second aspects, transmitting the RACH message includes transmitting the RACH message using the first RACH configuration based at least in part on the measurement not satisfying the measurement threshold, or transmitting the RACH message using the second RACH configuration based at least in part on the measurement satisfying the measurement threshold.

In a fourth aspect, alone or in combination with one or more of the first through third aspects, the RACH configuration, of the first RACH configuration and the second RACH configuration, used to transmit the RACH message is used for the RACH procedure until a completion criterion is detected.

In a fifth aspect, alone or in combination with one or more of the first through fourth aspects, the measurement is evaluated by the UE prior to transmitting the initial message associated with the RACH procedure and prior to each retransmission of the initial message to select a RACH configuration to be associated with an iteration of the RACH procedure.

In a sixth aspect, alone or in combination with one or more of the first through fifth aspects, transmitting the RACH message includes transmitting the RACH message using the first RACH configuration based at least in part on the measurement not satisfying the measurement threshold, wherein the first RACH configuration is used by the UE until a completion criterion is detected.

In a seventh aspect, alone or in combination with one or more of the first through sixth aspects, transmitting the RACH message includes transmitting the RACH message using the second RACH configuration based at least in part on the measurement satisfying the measurement threshold.

In an eighth aspect, alone or in combination with one or more of the first through seventh aspects, an iteration of the RACH procedure associated with the second RACH configuration is not successfully completed, and process 600 includes measuring the one or more downlink reference signals to obtain another measurement, and transmitting a retransmission of the initial message associated with the RACH procedure using the first RACH configuration or the second RACH configuration based at least in part on whether the other measurement satisfies the measurement threshold.

In a ninth aspect, alone or in combination with one or more of the first through eighth aspects, the retransmission of the initial message uses the first RACH configuration, and wherein the first RACH configuration is used by the UE until a completion criterion is detected.

In a tenth aspect, alone or in combination with one or more of the first through ninth aspects, the RACH procedure is performed for a quantity of iterations using the second RACH configuration without being successfully completed, and process 600 includes transmitting a retransmission of the initial message associated with the RACH procedure using the first RACH configuration based at least in part on the quantity of iterations satisfying another threshold.

In an eleventh aspect, alone or in combination with one or more of the first through tenth aspects, the RACH procedure is performed for a quantity of iterations using the second RACH configuration without being successfully completed, and process 600 includes measuring the one or more downlink reference signals to obtain another measurement based at least in part on the quantity of iterations satisfying another threshold, and transmitting a retransmission of the initial message associated with the RACH procedure using the first RACH configuration or the second RACH configuration based at least in part on whether the other measurement satisfies the measurement threshold.

In a twelfth aspect, alone or in combination with one or more of the first through eleventh aspects, the first RACH configuration is associated with repetitions of a message 3 (msg3) of the RACH procedure during each iteration of the RACH procedure.

In a thirteenth aspect, alone or in combination with one or more of the first through twelfth aspects, the selection of a RACH configuration, of the first RACH configuration or the second RACH configuration, is evaluated by the UE prior to each retransmission of the initial message or based at least in part on a quantity of transmissions of the initial message satisfying a threshold.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
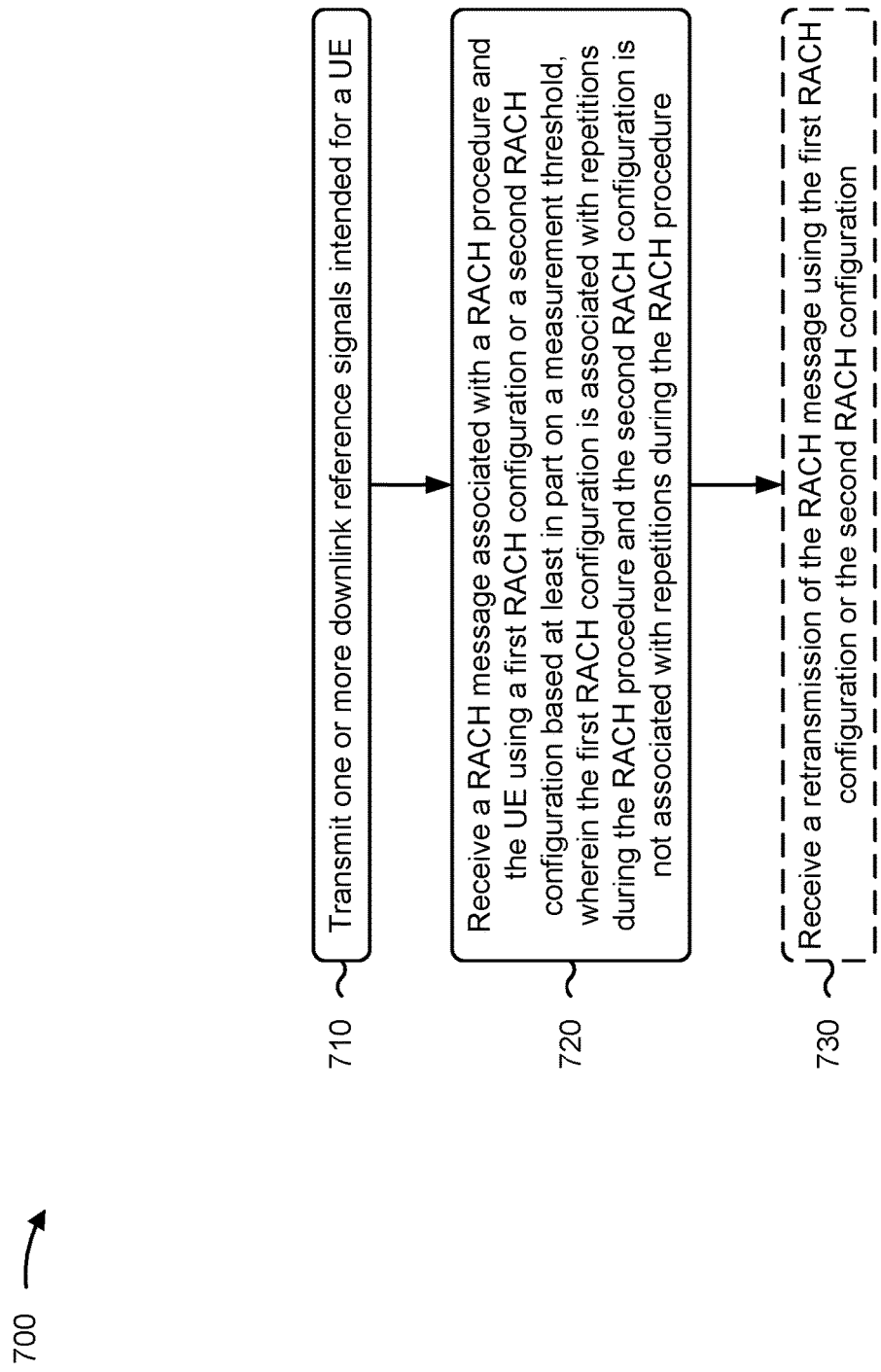

FIG. 7 is a diagram illustrating an example process 700 performed, for example, by a base station, in accordance with the present disclosure. Example process 700 is an example where the base station (e.g., base station 110) performs operations associated with RACH procedure type selection.

As shown in FIG. 7, in some aspects, process 700 may include transmitting one or more downlink reference signals intended for a UE (block 710). For example, the base station (e.g., using communication manager 150 and/or transmission component 1004, depicted in FIG. 10) may transmit one or more downlink reference signals intended for a UE, as described above. For example, the base station may transmit the one or more downlink reference signals as described in connection with FIG. 5 and reference number 510.

As further shown in FIG. 7, in some aspects, process 700 may include receiving a RACH message associated with a RACH procedure and the UE using a first RACH configuration or a second RACH configuration based at least in part on a measurement threshold, wherein the first RACH configuration is associated with repetitions during the RACH procedure and the second RACH configuration is not associated with repetitions during the RACH procedure (block 720). For example, the base station (e.g., using communication manager 150 and/or reception component 1002, depicted in FIG. 10) may receive a RACH message associated with a RACH procedure and the UE using a first RACH configuration or a second RACH configuration based at least in part on a measurement threshold, wherein the first RACH configuration is associated with repetitions during the RACH procedure and the second RACH configuration is not associated with repetitions during the RACH procedure, as described above. For example, the base station may receive the RACH message as described in connection with FIG. 5 and reference numbers 525, 530, 545, and/or 550.

As further shown in FIG. 7, in some aspects, process 700 may optionally include receiving, from the UE, a retransmission of the RACH message using the first RACH configuration or the second RACH configuration (block 730). For example, the base station (e.g., using communication manager 150 and/or reception component 1002, depicted in FIG. 10) may receive, from the UE, a retransmission of the RACH message using the first RACH configuration or the second RACH configuration, as described above. For example, the base station may receive the retransmission of the RACH message as described in connection with FIG. 5 and reference numbers 545, and/or 550. In some aspects, the same RACH configuration may be used for the initial transmission of the RACH message and the retransmission of the RACH message (e.g., selected by the UE prior to the initial transmission), as described above. In some other aspects, the UE may re-select a RACH configuration, of the first RACH configuration and the second RACH configuration, for the retransmission based at least in part on updated measurement(s) of the one or more downlink reference signals, as described above.

Process 700 may include additional aspects, such as any single aspect or any combination of aspects described below and/or in connection with one or more other processes described elsewhere herein.

In a first aspect, process 700 includes transmitting RACH configuration information intended for the UE indicating the first RACH configuration and the second RACH configuration.

In a second aspect, alone or in combination with the first aspect, process 700 includes performing the RACH procedure using the first RACH configuration or the second RACH configuration based at least in part on the measurement of the one or more downlink reference signals, wherein performing the RACH procedure includes receiving the RACH message.

In a third aspect, alone or in combination with one or more of the first and second aspects, the measurement is evaluated by the UE prior to a transmission of the initial message associated with the RACH procedure, and wherein receiving the RACH message includes receiving the RACH message using the first RACH configuration based at least in part on the measurement not satisfying the measurement threshold, or receiving the RACH message using the second RACH configuration based at least in part on the measurement satisfying the measurement threshold.

In a fourth aspect, alone or in combination with one or more of the first through third aspects, a RACH configuration, of the first RACH configuration and the second RACH configuration, used to receive the RACH message is used for the RACH procedure until the RACH procedure is completed.

In a fifth aspect, alone or in combination with one or more of the first through fourth aspects, the measurement is evaluated by the UE prior to a transmission the initial message associated with the RACH procedure and prior to each retransmission of the initial message to select a RACH configuration to be associated with an iteration of the RACH procedure.

In a sixth aspect, alone or in combination with one or more of the first through fifth aspects, receiving the RACH message includes receiving the RACH message using the first RACH configuration based at least in part on the measurement not satisfying the measurement threshold, wherein the first RACH configuration is used by the UE until the RACH procedure is completed.

In a seventh aspect, alone or in combination with one or more of the first through sixth aspects, receiving the RACH message includes receiving the RACH message using the second RACH configuration based at least in part on the measurement satisfying the measurement threshold.

In an eighth aspect, alone or in combination with one or more of the first through seventh aspects, an iteration of the RACH procedure associated with the second RACH configuration is not successfully completed, and process 700 includes transmitting, to the UE, another downlink reference signal of the one or more downlink reference signals, and receiving a retransmission of the initial message associated with the RACH procedure using the first RACH configuration or the second RACH configuration based at least in part on whether another measurement of the other downlink reference signal satisfies the measurement threshold.

In a ninth aspect, alone or in combination with one or more of the first through eighth aspects, the retransmission of the initial message uses the first RACH configuration, and wherein the first RACH configuration is used by the UE until the RACH procedure is completed.

In a tenth aspect, alone or in combination with one or more of the first through ninth aspects, the RACH procedure is performed for a quantity of iterations using the second RACH configuration without being successfully completed, and process 700 includes receiving a retransmission of the initial message associated with the RACH procedure using the first RACH configuration based at least in part on the quantity of iterations satisfying another threshold.

In an eleventh aspect, alone or in combination with one or more of the first through tenth aspects, the RACH procedure is performed for a quantity of iterations using the second RACH configuration without being successfully completed, and process 700 includes transmitting, to the UE, another downlink reference signal of the one or more downlink reference signals, and receiving a retransmission of the initial message associated with the RACH procedure using the first RACH configuration or the second RACH configuration based at least in part on whether another measurement of the other downlink reference signal satisfies the measurement threshold.

In a twelfth aspect, alone or in combination with one or more of the first through eleventh aspects, the first RACH configuration is associated with repetitions of a message 3 (msg3) of the RACH procedure during each iteration of the RACH procedure.

In a thirteenth aspect, alone or in combination with one or more of the first through twelfth aspects, the RACH message is a first message associated with the RACH procedure, and the first message is received using resources associated with the first RACH configuration, and process 700 includes transmitting, to the UE, an uplink grant for a second message associated with the RACH procedure, wherein the uplink grant includes resources for repetitions of the second message based at least in part on the first message being associated with resources associated with the first RACH configuration.

In a fourteenth aspect, alone or in combination with one or more of the first through thirteenth aspects, the RACH message is a first message associated with the RACH procedure, and the first message is received using resources associated with the second RACH configuration, and process 700 includes transmitting, to the UE, an uplink grant for a second message associated with the RACH procedure, wherein the uplink grant includes resources for a single transmission of the second message based at least in part on the first message being associated with resources associated with the second RACH configuration.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
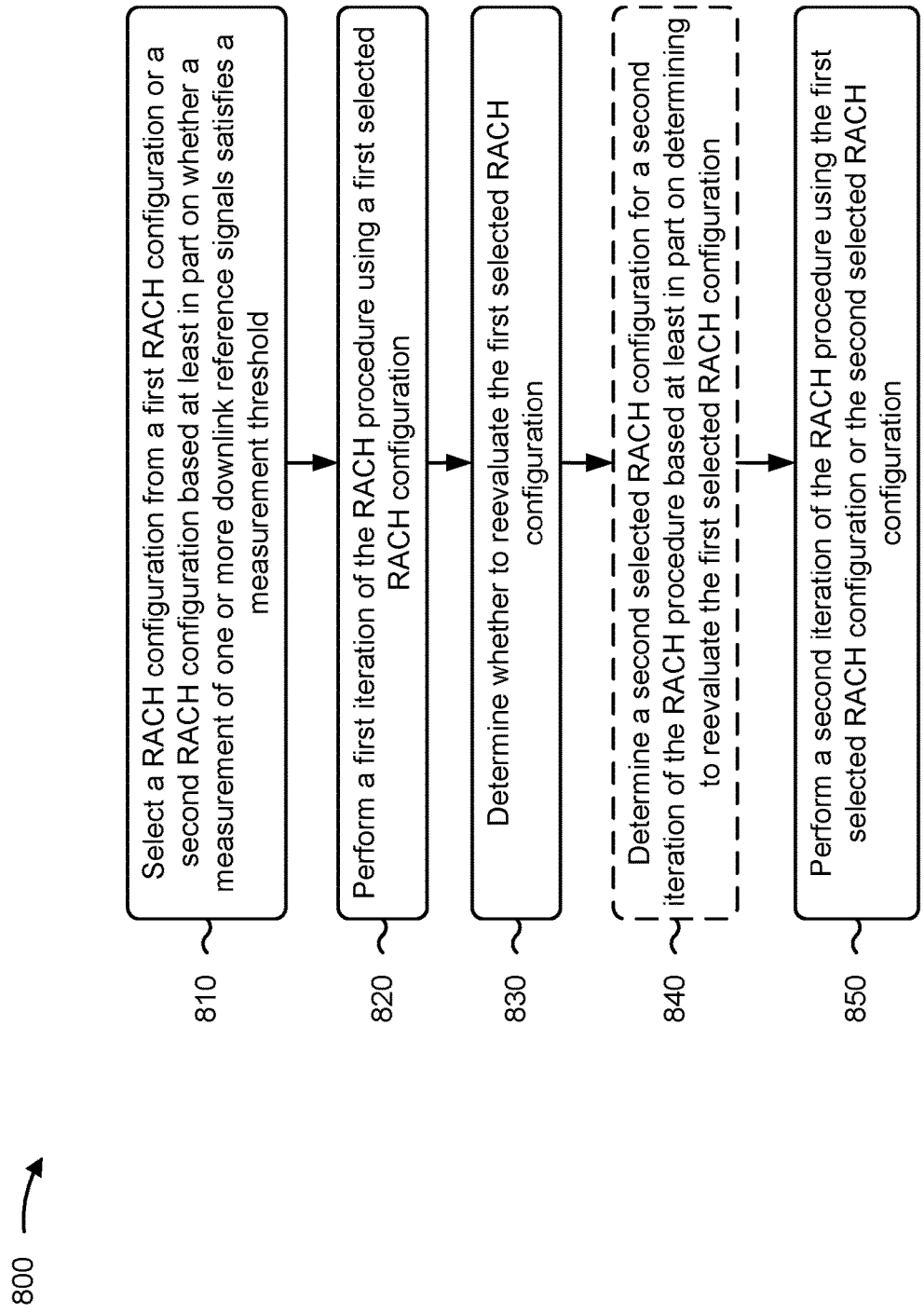

FIG. 8 is a diagram illustrating an example process 800 performed, for example, by a UE, in accordance with the present disclosure. Example process 800 is an example where the UE (e.g., UE 120) performs operations associated with RACH procedure type selection.

As shown in FIG. 8, in some aspects, process 800 may include selecting a RACH configuration from a first RACH configuration or a second RACH configuration based at least in part on whether a measurement of one or more downlink reference signals satisfies a measurement threshold (block 810). For example, the UE (e.g., using communication manager 140 and/or RACH type selection component 910, depicted in FIG. 9) may select a RACH configuration from a first RACH configuration or a second RACH configuration based at least in part on whether a measurement of the one or more downlink reference signals satisfies a measurement threshold, as described above. For example, the UE may select the RACH configuration as described in connection with FIG. 5 and reference numbers 520 and/or 540. As described elsewhere herein, the first RACH configuration may be associated with a first RACH procedure type (e.g., the coverage enhanced RACH procedure type) and/or may be associated with repetitions (e.g., of the msg3) during each iteration of the RACH procedure. The second RACH configuration may be associated with a second RACH procedure type (e.g., the traditional or legacy RACH procedure type) and/or may be associated with single transmissions of RACH messages during each iteration of the RACH procedure (e.g., may not be associated with repetitions).

As further shown in FIG. 8, in some aspects, process 800 may include performing a first iteration of the RACH procedure using a first selected RACH configuration (block 820). For example, the UE (e.g., using communication manager 140, transmission component 904, and/or reception component 902, depicted in FIG. 9) may perform a first iteration of the RACH procedure using a first selected RACH configuration, as described above. For example, the UE may perform the first iteration of the RACH procedure using the first selected RACH configuration that is selected by the UE at block 810. If the first selected RACH configuration is the first RACH configuration, then performing the first iteration of the RACH procedure may include transmitting multiple repetitions of a RACH message (e.g., a msg3) during the first iteration of the RACH procedure. If the first selected RACH configuration is the second RACH configuration, then performing the first iteration of the RACH procedure may include transmitting a single transmission for each uplink RACH message during the first iteration of the RACH procedure.

As further shown in FIG. 8, in some aspects, process 800 may include determining whether to reevaluate the first selected RACH configuration (block 830). For example, the UE (e.g., using communication manager 140 and/or RACH type selection component 910, depicted in FIG. 9) may determine whether to reevaluate the first selected RACH configuration, as described above. For example, in some aspects, the UE may determine whether to reevaluate the first selected RACH configuration based at least in part on the first iteration of the RACH procedure being unsuccessful. In some aspects, the UE may determine that the first selected RACH configuration is not to be reevaluated (e.g., based at least in part on selecting the first RACH configuration as the first selected RACH configuration at block 810). In some aspects, the UE may determine that the first selected RACH configuration is to be reevaluated (e.g., based at least in part on the first iteration of the RACH procedure being unsuccessful, based at least in part on selecting the second RACH configuration as the first selected RACH configuration at block 810, and/or based at least in part on a quantity of iterations, including the first iteration, performed by the UE satisfying a threshold). As described in more detail elsewhere herein, reevaluating the first selected RACH configuration may include obtaining new measurement values of the one or more downlink reference signals and selecting a RACH configuration, from the first RACH configuration and the second RACH configuration, based at least in part on the new measurement values.

As further shown in FIG. 8, in some aspects, process 800 may optionally include determining a second selected RACH configuration for a second iteration of the RACH procedure based at least in part on determining to reevaluate the first selected RACH configuration (block 840). For example, the UE (e.g., using communication manager 140 and/or RACH type selection component 910, depicted in FIG. 9) may determine a second selected RACH configuration for a second iteration of the RACH procedure based at least in part on determining to reevaluate the first selected RACH configuration, as described above. For example, the UE may select the second selected RACH configuration, from the first RACH configuration and the second RACH configuration, based at least in part on new measurement values of the one or more downlink reference signals. In some aspects, the UE may determine the second selected RACH configuration for a second iteration of the RACH procedure based at least in part on selecting the second RACH configuration (e.g., that is not associated with msg3 repetitions) as the first selected RACH configuration at block 810. In some aspects, block 840 may not be performed by the UE when the first selected RACH configuration is the first RACH configuration (e.g., that is associated with msg3 repetitions). For example, if the first selected RACH configuration is the first RACH configuration (e.g., that is associated with msg3 repetitions), then the UE may use the first RACH configuration for all iterations of the RACH procedure until a completion criteria is detected, as described above.

In some aspects, determining the second selected RACH configuration for the second iteration of the RACH procedure may include measuring (or obtaining measurement values associated with) the one or more downlink reference signals. The UE may determine the second selected RACH configuration for the second iteration of the RACH procedure based at least in part on the measurements of the one or more downlink reference signals. In some aspects, if a quantity of iterations performed by the UE, including the first iteration, satisfies a threshold, then the UE may determine that the second selected RACH configuration is the first RACH configuration (e.g., that is associated with msg3 repetitions).

As further shown in FIG. 8, in some aspects, process 800 may include performing a second iteration of the RACH procedure using the first selected RACH configuration or the second selected RACH configuration (block 850). For example, the UE (e.g., using communication manager 140, transmission component 904, and/or reception component 902, depicted in FIG. 9) may perform a second iteration of the RACH procedure using the first selected RACH configuration or the second selected RACH configuration, as described above. For example, if the UE determines that the first selected RACH configuration is not to be reevaluated (e.g., at block 830), then the UE may use the first selected RACH configuration to perform the second iteration of the RACH procedure. If the UE determines that the first selected RACH configuration is to be reevaluated (e.g., at block 830), then the UE may use the second selected RACH configuration to perform the second iteration of the RACH procedure. In some aspects, the first selected RACH configuration and the second selected RACH configuration may be the same RACH configuration. In some other aspects, the first selected RACH configuration and the second selected RACH configuration may be different RACH configurations.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel. Furthermore, although FIG. 8 shows a first iteration and a second iteration only a single iteration or more than two iterations may occur in some scenarios, as configured in some implementations. In some cases, if the first iteration is successful, process 800 may be terminated and blocks 830, 840, and/or 850 may not occur. For example, blocks 830, 840, and/or 850 may repeat a certain quantity of times if an iteration does not result in a successful RACH procedure. As a further example, a counter may limit the maximum quantity of times that blocks 830, 840, and/or 850 repeat if no iterations are successful. Similarly, determining at block 830 may be based at least in part on a quantity of previous iterations (e.g., a current state of the counter). In some cases, if the first iteration is successful, process 800 may be terminated and blocks 830, 840, and/or 850 may not occur.

Figure 9:
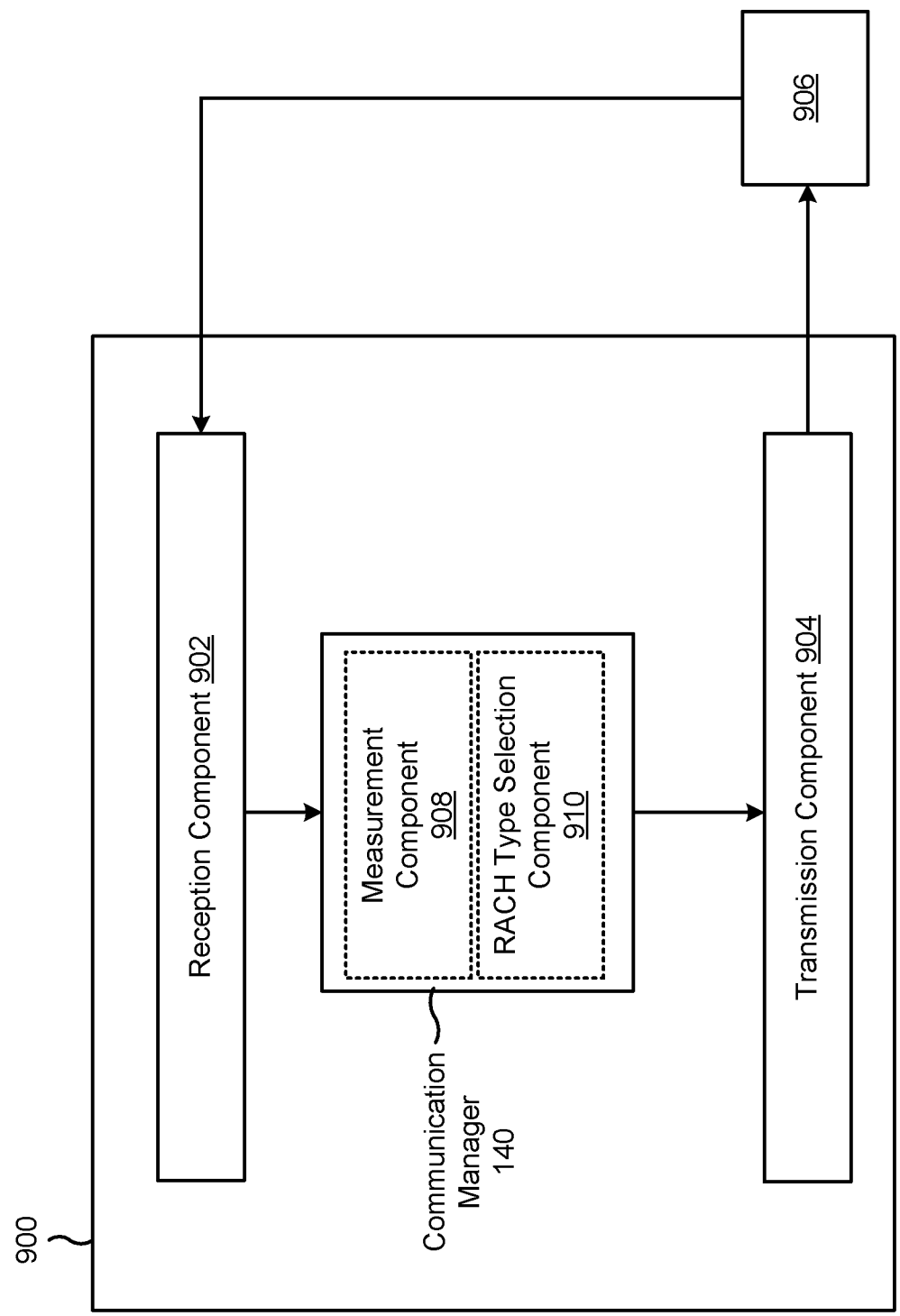
FIGS. 9 and 10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of a measurement component 908, and/or a RACH type selection component 910, among other examples.

In some aspects, the apparatus 900 may be configured to perform one or more operations described herein in connection with FIG. 5. Additionally, or alternatively, the apparatus 900 may be configured to perform one or more processes described herein, such as process 600 of FIG. 6 and/or process 800 of FIG. 8, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive one or more downlink reference signals. The transmission component 904 may transmit a RACH message associated with a RACH procedure using a first RACH configuration or a second RACH configuration based at least in part on whether a measurement of the one or more downlink reference signals satisfies a measurement threshold, wherein the first RACH configuration is associated with repetitions during the RACH procedure and the second RACH configuration is not associated with repetitions during the RACH procedure, and wherein a selection of a RACH configuration, of the first RACH configuration or the second RACH configuration, is evaluated by the UE prior to a transmission of an initial message associated with the RACH procedure, prior to each retransmission of the initial message, or based at least in part on a quantity of transmissions of the initial message satisfying a threshold.

The measurement component 908 may measure the one or more downlink reference signals. The RACH type selection component 910 may select a RACH configuration, of the first RACH configuration or the second RACH configuration, based at least in part on whether a measurement, of the one or more downlink reference signals, satisfies the measurement threshold.

In some aspects, the RACH type selection component 910 may select a RACH configuration, of the first RACH configuration or the second RACH configuration, for a retransmission of the RACH message based at least in part on a measurement of the one or more downlink reference signals obtain prior to transmitting the retransmission. In some aspects, the RACH type selection component 910 may select a RACH configuration, of the first RACH configuration or the second RACH configuration, for a retransmission of the RACH message prior to each retransmission of the RACH message. In some aspects, the RACH type selection component 910 may select a RACH configuration, of the first RACH configuration or the second RACH configuration, for a retransmission of the RACH message based at least in part on the quantity of transmissions of the initial message (or the quantity of iterations of the RACH procedure using the second RACH configuration without successfully completing the RACH procedure) satisfying another threshold.

The reception component 902 may receive, from the base station, RACH configuration information indicating the first RACH configuration and the second RACH configuration.

The reception component 902 and/or the transmission component 904 may perform, with the base station, the RACH procedure using the first RACH configuration or the second RACH configuration based at least in part on the measurement of the one or more downlink reference signals, wherein performing the RACH procedure includes transmitting the RACH message.

The quantity and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
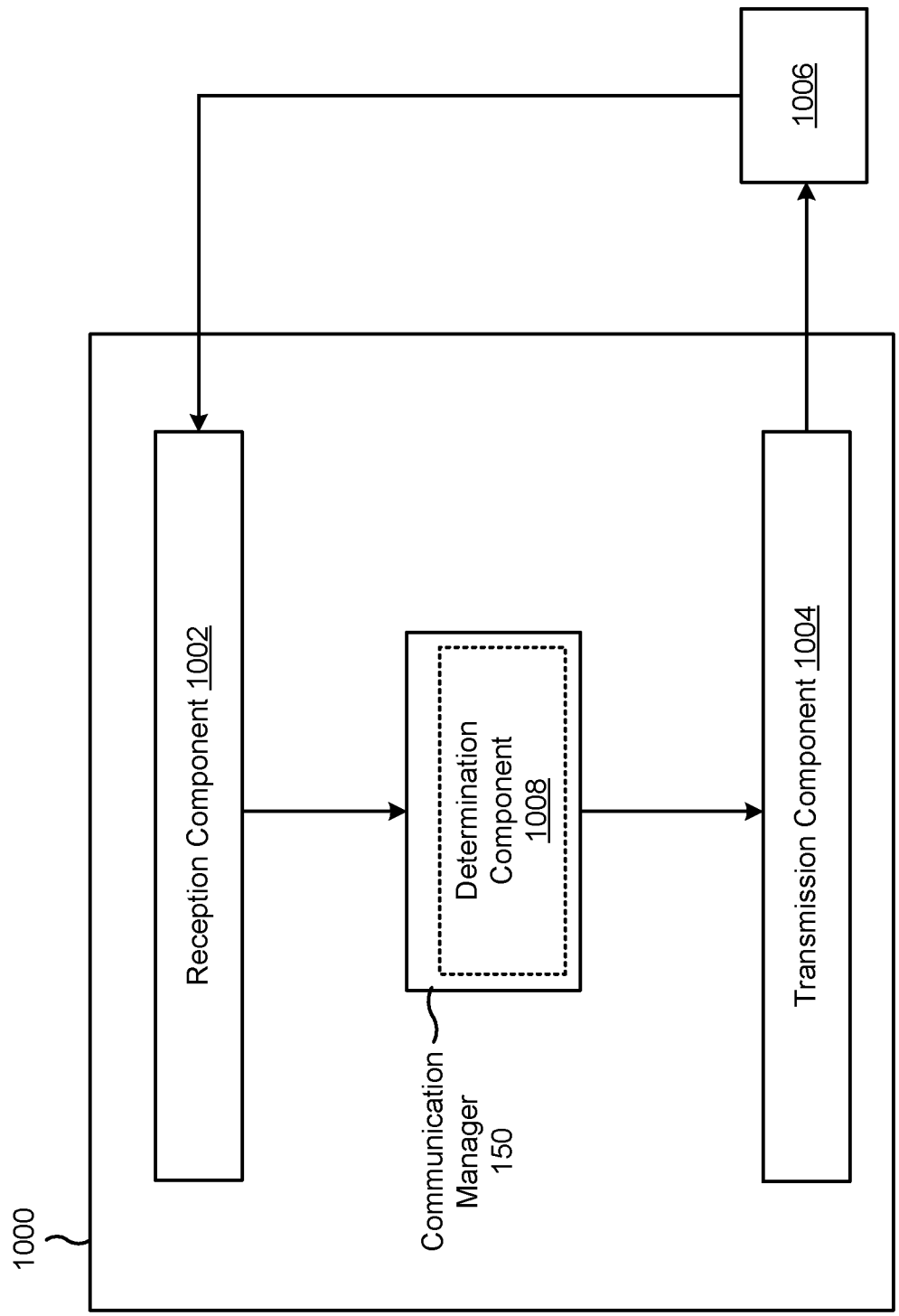

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a determination component 1008, among other examples.

In some aspects, the apparatus 1000 may be configured to perform one or more operations described herein in connection with FIG. 5. Additionally, or alternatively, the apparatus 1000 may be configured to perform one or more processes described herein, such as process 700 of FIG. 7, or a combination thereof. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The transmission component 1004 may transmit, to a UE, one or more downlink reference signals. The reception component 1002 may receive, from the UE, a RACH message associated with a RACH procedure using a first RACH configuration or a second RACH configuration based at least in part on a measurement threshold configured by the apparatus 1000, wherein the first RACH configuration is associated with repetitions during the RACH procedure and the second RACH configuration is not associated with repetitions during the RACH procedure.

The transmission component 1004 may transmit, to the UE, RACH configuration information indicating the first RACH configuration and the second RACH configuration. The determination component 1008 may determine the RACH configuration information. The determination component 1008 may determine the measurement threshold and/or the threshold.

The reception component 1002 and/or the transmission component 1004 may perform, with the UE, the RACH procedure using the first RACH configuration or the second RACH configuration based at least in part on the measurement of the one or more downlink reference signals, wherein performing the RACH procedure includes receiving the RACH message.

The quantity and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving one or more downlink reference signals; and transmitting a random access channel (RACH) message associated with a RACH procedure using a first RACH configuration or a second RACH configuration based at least in part on whether a measurement of the one or more downlink reference signals satisfies a measurement threshold, wherein the first RACH configuration is associated with repetitions during the RACH procedure and the second RACH configuration is not associated with repetitions during the RACH procedure, and wherein a selection of a RACH configuration, of the first RACH configuration or the second RACH configuration, is evaluated by the UE prior to a transmission of an initial message associated with the RACH procedure.

Aspect 2: The method of Aspect 1, further comprising: receiving RACH configuration information indicating the first RACH configuration and the second RACH configuration.

Aspect 3: The method of any of Aspects 1-2, further comprising: performing the RACH procedure using the first RACH configuration or the second RACH configuration based at least in part on the measurement of the one or more downlink reference signals, wherein performing the RACH procedure includes transmitting the RACH message.

Aspect 4: The method of any of Aspects 1-3, wherein transmitting the RACH message comprises: transmitting the RACH message using the first RACH configuration based at least in part on the measurement not satisfying the measurement threshold; or transmitting the RACH message using the second RACH configuration based at least in part on the measurement satisfying the measurement threshold.

Aspect 5: The method of any of Aspects 1-4, wherein the RACH configuration, of the first RACH configuration and the second RACH configuration, used to transmit the RACH message is used for the RACH procedure until a completion criterion is detected.

Aspect 6: The method of any of Aspects 1-5, wherein the measurement is evaluated by the UE prior to transmitting the initial message associated with the RACH procedure and prior to each retransmission of the initial message to select a RACH configuration to be associated with an iteration of the RACH procedure.

Aspect 7: The method of any of Aspects 1-6, wherein transmitting the RACH message comprises: transmitting the RACH message using the first RACH configuration based at least in part on the measurement not satisfying the measurement threshold, wherein the first RACH configuration is used by the UE until a completion criterion is detected.

Aspect 8: The method of any of Aspects 1-7, wherein transmitting the RACH message comprises: transmitting the RACH message using the second RACH configuration based at least in part on the measurement satisfying the measurement threshold.

Aspect 9: The method of Aspect 8, wherein an iteration of the RACH procedure associated with the second RACH configuration is not successfully completed, the method further comprising: measuring the one or more downlink reference signals to obtain another measurement; and transmitting a retransmission of the initial message associated with the RACH procedure using the first RACH configuration or the second RACH configuration based at least in part on whether the other measurement satisfies the measurement threshold.

Aspect 10: The method of Aspect 9, wherein the retransmission of the initial message uses the first RACH configuration, and wherein the first RACH configuration is used by the UE until a completion criterion is detected.

Aspect 11: The method of any of Aspects 8-10, wherein the RACH procedure is performed for a quantity of iterations using the second RACH configuration without being successfully completed, the method further comprising: transmitting a retransmission of the initial message associated with the RACH procedure using the first RACH configuration based at least in part on the quantity of iterations satisfying another threshold.

Aspect 12: The method of any of Aspects 8-11, wherein the RACH procedure is performed for a quantity of iterations using the second RACH configuration without being successfully completed, the method further comprising: measuring the one or more downlink reference signals to obtain another measurement based at least in part on the quantity of iterations satisfying another threshold; and transmitting a retransmission of the initial message associated with the RACH procedure using the first RACH configuration or the second RACH configuration based at least in part on whether the other measurement satisfies the measurement threshold.

Aspect 13: The method of any of Aspects 1-12, wherein the first RACH configuration is associated with repetitions of a message 3 (msg3) of the RACH procedure during each iteration of the RACH procedure.

Aspect 14: The method of any of Aspects 1-13, wherein the selection of a RACH configuration, of the first RACH configuration or the second RACH configuration, is evaluated by the UE prior to each retransmission of the initial message or based at least in part on a quantity of transmissions of the initial message satisfying a threshold.

Aspect 15: A method of wireless communication performed by a base station, comprising: transmitting one or more downlink reference signals intended for a user equipment (UE); and receiving a random access channel (RACH) message associated with a RACH procedure and the UE using a first RACH configuration or a second RACH configuration based at least in part on a measurement threshold, wherein the first RACH configuration is associated with repetitions during the RACH procedure and the second RACH configuration is not associated with repetitions during the RACH procedure.

Aspect 16: The method of Aspect 15, further comprising: transmitting RACH configuration information intended for the UE indicating the first RACH configuration and the second RACH configuration.

Aspect 17: The method of any of Aspects 15-16, further comprising: performing the RACH procedure using the first RACH configuration or the second RACH configuration based at least in part on a measurement of the one or more downlink reference signals, wherein performing the RACH procedure includes receiving the RACH message.

Aspect 18: The method of any of Aspects 15-17, wherein a measurement of the one or more downlink reference signals is evaluated by the UE prior to a transmission of the initial message associated with the RACH procedure, and wherein receiving the RACH message comprises: receiving the RACH message using the first RACH configuration based at least in part on the measurement not satisfying the measurement threshold; or receiving the RACH message using the second RACH configuration based at least in part on the measurement satisfying the measurement threshold.

Aspect 19: The method of any of Aspects 15-18, wherein a RACH configuration, of the first RACH configuration and the second RACH configuration, used to receive the RACH message is used for the RACH procedure until the RACH procedure is completed.

Aspect 20: The method of any of Aspects 15-19, wherein a measurement of the one or more downlink reference signals is evaluated by the UE prior to a transmission the initial message associated with the RACH procedure and prior to each retransmission of the initial message to select a RACH configuration to be associated with an iteration of the RACH procedure.

Aspect 21: The method of any of Aspects 15-20, wherein receiving the RACH message comprises: receiving the RACH message using the first RACH configuration based at least in part on a measurement of the one or more downlink reference signals not satisfying the measurement threshold, wherein the first RACH configuration is used by the UE until the RACH procedure is completed.

Aspect 22: The method of any of Aspects 15-21, wherein receiving the RACH message comprises: receiving the RACH message using the second RACH configuration based at least in part on a measurement of the one or more downlink reference signals satisfying the measurement threshold.

Aspect 23: The method of Aspect 22, wherein an iteration of the RACH procedure associated with the second RACH configuration is not successfully completed, the method further comprising: transmitting another downlink reference signal of the one or more downlink reference signals; and receiving a retransmission of the initial message associated with the RACH procedure using the first RACH configuration or the second RACH configuration based at least in part on whether another measurement of the other downlink reference signal satisfies the measurement threshold.

Aspect 24: The method of Aspect 23, wherein the retransmission of the initial message uses the first RACH configuration, and wherein the first RACH configuration is used by the UE until the RACH procedure is completed.

Aspect 25: The method of any of Aspects 22-24, wherein the RACH procedure is performed for a quantity of iterations using the second RACH configuration without being successfully completed, the method further comprising: receiving a retransmission of the initial message associated with the RACH procedure using the first RACH configuration based at least in part on the quantity of iterations satisfying another threshold.

Aspect 26: The method of Aspect 22-25, wherein the RACH procedure is performed for a quantity of iterations using the second RACH configuration without being successfully completed, the method further comprising: transmitting another downlink reference signal of the one or more downlink reference signals; and receiving a retransmission of the initial message associated with the RACH procedure using the first RACH configuration or the second RACH configuration based at least in part on whether another measurement of the other downlink reference signal satisfies the measurement threshold.

Aspect 27: The method of any of Aspects 15-26, wherein the first RACH configuration is associated with repetitions of a message 3 (msg3) of the RACH procedure during each iteration of the RACH procedure.

Aspect 28: The method of any of Aspects 15-27, wherein the RACH message is a first message associated with the RACH procedure, and wherein the first message is received using resources associated with the first RACH configuration, the method further comprising: transmitting, to the UE, an uplink grant for a second message associated with the RACH procedure, wherein the uplink grant includes resources for repetitions of the second message based at least in part on the first message being associated with resources associated with the first RACH configuration.

Aspect 29: The method of any of Aspects 15-27, wherein the RACH message is a first message associated with the RACH procedure, and wherein the first message is received using resources associated with the second RACH configuration, the method further comprising: transmitting, to the UE, an uplink grant for a second message associated with the RACH procedure, wherein the uplink grant includes resources for a single transmission of the second message based at least in part on the first message being associated with resources associated with the second RACH configuration.

Aspect 30: An apparatus for wireless communication at a device, comprising a processor; memory coupled with the processor; and instructions stored in the memory and executable by the processor to cause the apparatus to perform the method of one or more of Aspects 1-14.

Aspect 31: A device for wireless communication, comprising a memory and one or more processors coupled to the memory, the one or more processors configured to perform the method of one or more of Aspects 1-14.

Aspect 32: An apparatus for wireless communication, comprising at least one means for performing the method of one or more of Aspects 1-14.

Aspect 33: A non-transitory computer-readable medium storing code for wireless communication, the code comprising instructions executable by a processor to perform the method of one or more of Aspects 1-14.

Aspect 34: A non-transitory computer-readable medium storing a set of instructions for wireless communication, the set of instructions comprising one or more instructions that, when executed by one or more processors of a device, cause the device to perform the method of one or more of Aspects 1-14.

Aspect 35: An apparatus for wireless communication at a device, comprising a processor; memory coupled with the processor; and instructions stored in the memory and executable by the processor to cause the apparatus to perform the method of one or more of Aspects 15-29.

Aspect 36: A device for wireless communication, comprising a memory and one or more processors coupled to the memory, the one or more processors configured to perform the method of one or more of Aspects 15-29.

Aspect 37: An apparatus for wireless communication, comprising at least one means for performing the method of one or more of Aspects 15-29.

Aspect 38: A non-transitory computer-readable medium storing code for wireless communication, the code comprising instructions executable by a processor to perform the method of one or more of Aspects 15-29.

Aspect 39: A non-transitory computer-readable medium storing a set of instructions for wireless communication, the set of instructions comprising one or more instructions that, when executed by one or more processors of a device, cause the device to perform the method of one or more of Aspects 15-29.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving one or more downlink reference signals; and
    transmitting a random access channel (RACH) message associated with a RACH procedure using a first RACH configuration or a second RACH configuration based at least in part on whether a measurement of the one or more downlink reference signals satisfies a measurement threshold,
    wherein the first RACH configuration is associated with repetitions during the RACH procedure and the second RACH configuration is not associated with repetitions during the RACH procedure, and
    wherein a selection of a RACH configuration, of the first RACH configuration or the second RACH configuration, is evaluated by the UE prior to a transmission of an initial message associated with the RACH procedure.

2. The method of claim 1, wherein the selection of a RACH configuration, of the first RACH configuration or the second RACH configuration, is evaluated by the UE prior to each retransmission of the initial message or based at least in part on a quantity of transmissions of the initial message satisfying another threshold.

3. The method of claim 1, further comprising:
    receiving RACH configuration information indicating the first RACH configuration and the second RACH configuration.

4. The method of claim 1, further comprising:
    performing the RACH procedure using the first RACH configuration or the second RACH configuration based at least in part on the measurement of the one or more downlink reference signals, wherein performing the RACH procedure includes transmitting the RACH message.

5. The method of claim 1, wherein transmitting the RACH message comprises:
    transmitting the RACH message using the first RACH configuration based at least in part on the measurement not satisfying the measurement threshold; or
    transmitting the RACH message using the second RACH configuration based at least in part on the measurement satisfying the measurement threshold.

6. The method of claim 1, wherein the RACH configuration, of the first RACH configuration and the second RACH configuration, used to transmit the RACH message is used for the RACH procedure until a completion criterion is detected.

7. The method of claim 1, wherein the measurement is evaluated by the UE prior to transmitting the initial message associated with the RACH procedure and prior to each retransmission of the initial message to select a RACH configuration to be associated with an iteration of the RACH procedure.

8. The method of claim 1, wherein transmitting the RACH message comprises:
transmitting the RACH message using the second RACH configuration based at least in part on the measurement satisfying the measurement threshold.

9. The method of claim 8, wherein an iteration of the RACH procedure associated with the second RACH configuration is not successfully completed, the method further comprising:
measuring the one or more downlink reference signals to obtain another measurement; and
transmitting a retransmission of the initial message associated with the RACH procedure using the first RACH configuration or the second RACH configuration based at least in part on whether the other measurement satisfies the measurement threshold.

10. The method of claim 9, wherein the retransmission of the initial message uses the first RACH configuration, and wherein the first RACH configuration is used by the UE until a completion criterion is detected.

11. The method of claim 8, wherein the RACH procedure is performed for a quantity of iterations using the second RACH configuration without being successfully completed, the method further comprising:
transmitting a retransmission of the initial message associated with the RACH procedure using the first RACH configuration based at least in part on the quantity of iterations satisfying another threshold.

12. The method of claim 8, wherein the RACH procedure is performed for a quantity of iterations using the second RACH configuration without being successfully completed, the method further comprising:
measuring the one or more downlink reference signals to obtain another measurement based at least in part on the quantity of iterations satisfying another threshold; and
transmitting a retransmission of the initial message associated with the RACH procedure using the first RACH configuration or the second RACH configuration based at least in part on whether the other measurement satisfies the measurement threshold.

13. A method of wireless communication performed by a network entity, comprising:
transmitting one or more downlink reference signals intended for a user equipment (UE); and
receiving a random access channel (RACH) message associated with a RACH procedure from the UE using a first RACH configuration or a second RACH configuration based at least in part on whether a measurement of the one or more downlink reference signals satisfies a measurement threshold, wherein the first RACH configuration is associated with repetitions during the RACH procedure and the second RACH configuration is not associated with repetitions during the RACH procedure, and
wherein receiving the RACH message comprises:
receiving the RACH message using the first RACH configuration based at least in part on the measurement not satisfying the measurement threshold; or
receiving the RACH message using the second RACH configuration based at least in part on the measurement satisfying the measurement threshold.

14. The method of claim 13, further comprising:
transmitting RACH configuration information intended for the UE indicating the first RACH configuration and the second RACH configuration.

15. The method of claim 13, wherein the measurement is evaluated by the UE prior to a transmission of an initial message associated with the RACH procedure.

16. A user equipment (UE) for wireless communication, comprising:
one or more memories; and
one or more processors, coupled to the one or more memories, configured to:
receive one or more downlink reference signals; and
transmit a random access channel (RACH) message associated with a RACH procedure using a first RACH configuration or a second RACH configuration based at least in part on whether a measurement of the one or more downlink reference signals satisfies a measurement threshold, wherein the first RACH configuration is associated with repetitions during the RACH procedure and the second RACH configuration is not associated with repetitions during the RACH procedure, and wherein a selection of a RACH configuration, of the first RACH configuration or the second RACH configuration, is evaluated by the UE prior to a transmission of an initial message associated with the RACH procedure.

17. The UE of claim 16, wherein the one or more processors are further configured to:
receive RACH configuration information indicating the first RACH configuration and the second RACH configuration.

18. The UE of claim 16, wherein the one or more processors are further configured to:
perform the RACH procedure using the first RACH configuration or the second RACH configuration based at least in part on the measurement of the one or more downlink reference signals, wherein performing the RACH procedure includes transmitting the RACH message.

19. The UE of claim 16, wherein the one or more processors, to transmit the RACH message, are configured to:
transmit the RACH message using the first RACH configuration based at least in part on the measurement not satisfying the measurement threshold; or
transmit the RACH message using the second RACH configuration based at least in part on the measurement satisfying the measurement threshold.

20. The UE of claim 16, wherein the measurement is evaluated by the UE prior to transmitting the initial message associated with the RACH procedure and prior to each retransmission of the initial message to select a RACH configuration to be associated with an iteration of the RACH procedure.

21. The UE of claim 16, wherein the one or more processors, to transmit the RACH message, are configured to:
transmit the RACH message using the first RACH configuration based at least in part on the measurement not satisfying the measurement threshold, wherein the first RACH configuration is used by the UE until a completion criterion is detected.

22. The UE of claim 16, wherein the one or more processors, to transmit the RACH message, are configured to:
transmit the RACH message using the second RACH configuration based at least in part on the measurement satisfying the measurement threshold.

23. The UE of claim 22, wherein an iteration of the RACH procedure associated with the second RACH configuration is not successfully completed, and wherein the one or more processors are further configured to:
    measure the one or more downlink reference signals to obtain another measurement; and
    transmit a retransmission of the initial message associated with the RACH procedure using the first RACH configuration or the second RACH configuration based at least in part on whether the other measurement satisfies the measurement threshold.

24. The UE of claim 23, wherein the retransmission of the initial message uses the first RACH configuration, and wherein the first RACH configuration is used by the UE until a completion criterion is detected.

25. The UE of claim 22, wherein the RACH procedure is performed for a quantity of iterations using the second RACH configuration without being successfully completed, and wherein the one or more processors are further configured to:
    measure the one or more downlink reference signals to obtain another measurement based at least in part on the quantity of iterations satisfying another threshold; and
    transmit a retransmission of the initial message associated with the RACH procedure using the first RACH configuration or the second RACH configuration based at least in part on whether the other measurement satisfies the measurement threshold.

26. The UE of claim 16, wherein the first RACH configuration is associated with repetitions of a message 3 (msg3) of the RACH procedure during each iteration of the RACH procedure.

27. A network entity for wireless communication, comprising:
    one or more memories; and
    one or more processors, coupled to the one or more memories, configured to:
        transmit, to a user equipment (UE), one or more downlink reference signals; and
        receive, from the UE, a random access channel (RACH) message associated with a RACH procedure using a first RACH configuration or a second RACH configuration based at least in part on a measurement threshold configured by the network entity, wherein the first RACH configuration is associated with repetitions during the RACH procedure and the second RACH configuration is not associated with repetitions during the RACH procedure.

28. The network entity of claim 27, wherein the one or more processors are further configured to:
    perform the RACH procedure using the first RACH configuration or the second RACH configuration based at least in part on a measurement of the one or more downlink reference signals, wherein performing the RACH procedure includes receiving the RACH message.

29. The network entity of claim 27, wherein a measurement of the one or more downlink reference signals is evaluated by the UE prior to a transmission of an initial message associated with the RACH procedure, and wherein the one or more processors, to receive the RACH message, are configured to:
    receive the RACH message using the first RACH configuration based at least in part on the measurement not satisfying the measurement threshold; or
    receive the RACH message using the second RACH configuration based at least in part on the measurement satisfying the measurement threshold.

30. The network entity of claim 27, wherein a RACH configuration, of the first RACH configuration and the second RACH configuration, used to receive the RACH message is used for the RACH procedure until the RACH procedure is completed.

* * * * *